United States Patent
Binion et al.

(10) Patent No.: US 9,892,567 B2
(45) Date of Patent: Feb. 13, 2018

(54) VEHICLE SENSOR COLLECTION OF OTHER VEHICLE INFORMATION

(71) Applicant: STATE FARM MUTUAL AUTOMOBILE INSURANCE COMPANY, Bloomington, IL (US)

(72) Inventors: Todd Binion, Bloomington, IL (US); Joe Harr, Bloomington, IL (US); Brian Fields, Normal, IL (US); Steven Cielocha, Bloomington, IL (US); Steve J. Balbach, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/057,447

(22) Filed: Oct. 18, 2013

(65) Prior Publication Data
US 2015/0112504 A1 Apr. 23, 2015

(51) Int. Cl.
*G06Q 40/08* (2012.01)
*G07C 5/00* (2006.01)

(52) U.S. Cl.
CPC ............ *G07C 5/008* (2013.01); *G06Q 40/08* (2013.01)

(58) Field of Classification Search
CPC ...... G06Q 40/08; G07C 5/008; G07C 5/0891; G08G 1/205; G08G 1/0175; G08G 1/20; G08G 1/161; G08G 1/0104; G08G 1/164; G01S 5/0027; G01S 17/023; G01S 17/936; G09F 21/04; B60W 2550/402
USPC ..... 701/1, 117, 301, 32.2, 33.4, 36, 123, 23, 701/26; 705/4, 13; 340/435, 436, 439, 340/441
See application file for complete search history.

(56) References Cited

U.S. PATENT DOCUMENTS

| 5,499,182 | A | 3/1996 | Ousborne |
| 5,797,134 | A | 8/1998 | McMillan et al. |
| 6,067,488 | A | 5/2000 | Tano |
| 6,141,611 | A * | 10/2000 | Mackey et al. ............. 701/32.2 |
| 6,246,933 | B1 | 6/2001 | Bague |
| 6,298,290 | B1 | 10/2001 | Abe et al. |

(Continued)

FOREIGN PATENT DOCUMENTS

| EP | 700009 A2 | 3/1996 |
| GB | 2268608 A | 1/1994 |

(Continued)

OTHER PUBLICATIONS

Search Report in EP Application No. 13167206.5 dated Aug. 13, 2013, 6 pages.

(Continued)

*Primary Examiner* — Truc M Do
(74) *Attorney, Agent, or Firm* — Marshall, Gerstein & Borun LLP; Randall G. Rueth

(57) ABSTRACT

A method, implemented in an electronic processing system that includes a memory and one or more processors, includes receiving, at the electronic processing system, sensor data representing information collected by a sensor (i) located on or in a first vehicle and (ii) configured to sense an environment external to the first vehicle, storing the received sensor data in the memory, and determining, via the one or more processors and based on the stored sensor data, an identifying characteristic of a second vehicle different than the first vehicle.

6 Claims, 12 Drawing Sheets

(56) References Cited

U.S. PATENT DOCUMENTS

| | | | |
|---|---|---|---|
| 6,570,609 B1 | 5/2003 | Heien | |
| 6,795,759 B2* | 9/2004 | Doyle | 701/32.6 |
| 6,832,141 B2 | 12/2004 | Skeen et al. | |
| 7,254,482 B2 | 8/2007 | Kawasaki et al. | |
| 7,386,376 B2 | 6/2008 | Basir et al. | |
| 7,783,505 B2 | 8/2010 | Roschelle et al. | |
| 7,865,378 B2* | 1/2011 | Gay | G06Q 10/10 705/4 |
| 7,881,951 B2 | 2/2011 | Roschelle et al. | |
| 7,890,355 B2* | 2/2011 | Gay | G06Q 10/10 705/4 |
| 7,904,219 B1* | 3/2011 | Lowrey | G01C 21/26 701/32.3 |
| 7,987,103 B2* | 7/2011 | Gay | G06Q 10/10 705/4 |
| 7,991,629 B2* | 8/2011 | Gay | G06Q 10/10 705/4 |
| 8,035,508 B2 | 10/2011 | Breed | |
| 8,090,598 B2 | 1/2012 | Bauer et al. | |
| 8,095,394 B2 | 1/2012 | Nowak et al. | |
| 8,117,049 B2 | 2/2012 | Berkobin et al. | |
| 8,140,358 B1 | 3/2012 | Ling et al. | |
| 8,140,359 B2 | 3/2012 | Daniel | |
| 8,180,522 B2 | 5/2012 | Tuff | |
| 8,180,655 B1 | 5/2012 | Hopkins, III | |
| 8,188,887 B2 | 5/2012 | Catten et al. | |
| 8,190,323 B2 | 5/2012 | Maeda et al. | |
| 8,255,243 B2 | 8/2012 | Raines et al. | |
| 8,255,244 B2 | 8/2012 | Raines et al. | |
| 8,260,489 B2 | 9/2012 | Nielsen et al. | |
| 8,260,639 B1* | 9/2012 | Medina et al. | 705/4 |
| 8,265,861 B2 | 9/2012 | Ikeda et al. | |
| 8,280,752 B1 | 10/2012 | Cripe et al. | |
| 8,311,858 B2 | 11/2012 | Everett et al. | |
| 8,314,708 B2 | 11/2012 | Gunderson et al. | |
| 8,340,893 B2* | 12/2012 | Yamaguchi | G08G 1/163 701/301 |
| 8,340,902 B1* | 12/2012 | Chiang | G05D 1/0044 340/425.5 |
| 8,352,118 B1 | 1/2013 | Mittelsteadt et al. | |
| 8,355,837 B2 | 1/2013 | Avery et al. | |
| 8,364,391 B2 | 1/2013 | Nagase et al. | |
| 8,386,168 B2 | 2/2013 | Hao | |
| 8,447,231 B2 | 5/2013 | Bai et al. | |
| 8,554,587 B1 | 10/2013 | Nowak et al. | |
| 8,566,126 B1* | 10/2013 | Hopkins, III | 705/4 |
| 8,849,558 B2 | 9/2014 | Morotomi et al. | |
| 9,056,395 B1 | 6/2015 | Ferguson et al. | |
| 9,147,353 B1* | 9/2015 | Slusar | G09B 19/167 |
| 9,230,441 B2 | 1/2016 | Sung et al. | |
| 2001/0005217 A1 | 6/2001 | Hamilton et al. | |
| 2002/0016655 A1 | 2/2002 | Joao | |
| 2002/0111725 A1 | 8/2002 | Burge | |
| 2002/0116228 A1 | 8/2002 | Bauer et al. | |
| 2002/0128882 A1 | 9/2002 | Nakagawa et al. | |
| 2003/0028298 A1* | 2/2003 | Macky et al. | 701/35 |
| 2003/0061160 A1 | 3/2003 | Asahina | |
| 2003/0200123 A1* | 10/2003 | Burge et al. | 705/4 |
| 2004/0039503 A1* | 2/2004 | Doyle | 701/35 |
| 2004/0111301 A1 | 6/2004 | Wahlbin et al. | |
| 2004/0122639 A1 | 6/2004 | Qiu | |
| 2004/0153362 A1 | 8/2004 | Bauer et al. | |
| 2004/0226043 A1 | 11/2004 | Mettu et al. | |
| 2004/0260579 A1* | 12/2004 | Tremiti | 705/4 |
| 2005/0073438 A1 | 4/2005 | Rodgers et al. | |
| 2005/0259151 A1* | 11/2005 | Hamilton et al. | 348/148 |
| 2006/0031103 A1 | 2/2006 | Henry | |
| 2006/0136291 A1* | 6/2006 | Morita et al. | 705/13 |
| 2006/0184295 A1 | 8/2006 | Hawkins et al. | |
| 2006/0212195 A1* | 9/2006 | Veith et al. | 701/35 |
| 2007/0027726 A1* | 2/2007 | Warren | G06Q 40/08 705/4 |
| 2007/0055422 A1 | 3/2007 | Anzai et al. | |
| 2007/0132773 A1 | 6/2007 | Plante | |
| 2007/0149208 A1 | 6/2007 | Syrbe et al. | |
| 2008/0027761 A1* | 1/2008 | Bracha | 705/4 |
| 2008/0052134 A1 | 2/2008 | Nowak et al. | |
| 2008/0061953 A1* | 3/2008 | Bhogal et al. | 340/435 |
| 2008/0065427 A1 | 3/2008 | Helitzer et al. | |
| 2008/0084473 A1 | 4/2008 | Romanowich | |
| 2008/0111666 A1 | 5/2008 | Plante et al. | |
| 2008/0114502 A1 | 5/2008 | Breed et al. | |
| 2008/0126137 A1* | 5/2008 | Kidd et al. | 705/4 |
| 2008/0147266 A1 | 6/2008 | Plante et al. | |
| 2008/0147267 A1 | 6/2008 | Plante et al. | |
| 2008/0189142 A1 | 8/2008 | Brown et al. | |
| 2008/0195457 A1 | 8/2008 | Sherman et al. | |
| 2008/0255887 A1* | 10/2008 | Gruter | 705/4 |
| 2008/0255888 A1 | 10/2008 | Berkobin et al. | |
| 2008/0258890 A1* | 10/2008 | Follmer et al. | 340/439 |
| 2008/0297488 A1 | 12/2008 | Operowsky et al. | |
| 2008/0319665 A1 | 12/2008 | Berkobin et al. | |
| 2009/0015684 A1* | 1/2009 | Ooga et al. | 348/222.1 |
| 2009/0115638 A1 | 5/2009 | Shankwitz et al. | |
| 2009/0132294 A1* | 5/2009 | Haines | 705/4 |
| 2009/0207005 A1 | 8/2009 | Habetha et al. | |
| 2009/0267801 A1* | 10/2009 | Kawai | G08G 1/04 340/988 |
| 2010/0004995 A1 | 1/2010 | Hickman | |
| 2010/0030540 A1* | 2/2010 | Choi | G06Q 40/08 703/8 |
| 2010/0030586 A1* | 2/2010 | Taylor | G06Q 30/02 705/4 |
| 2010/0076646 A1 | 3/2010 | Basir et al. | |
| 2010/0128127 A1 | 5/2010 | Ciolli | |
| 2010/0131300 A1 | 5/2010 | Collopy et al. | |
| 2010/0131302 A1 | 5/2010 | Collopy et al. | |
| 2010/0131304 A1* | 5/2010 | Collopy | G06Q 30/0224 705/4 |
| 2010/0157061 A1* | 6/2010 | Katsman | G07C 5/008 348/149 |
| 2010/0219944 A1* | 9/2010 | McCormick | G07C 5/0866 340/436 |
| 2010/0293033 A1 | 11/2010 | Hall et al. | |
| 2010/0299021 A1* | 11/2010 | Jalili | G07C 5/085 701/33.4 |
| 2011/0054767 A1 | 3/2011 | Schafer et al. | |
| 2011/0060496 A1 | 3/2011 | Nielsen et al. | |
| 2011/0066310 A1 | 3/2011 | Sakai et al. | |
| 2011/0090093 A1 | 4/2011 | Grimm et al. | |
| 2011/0093350 A1 | 4/2011 | Laumeyer et al. | |
| 2011/0106370 A1 | 5/2011 | Duddle et al. | |
| 2011/0133954 A1 | 6/2011 | Ooshima et al. | |
| 2011/0137684 A1 | 6/2011 | Peak et al. | |
| 2011/0140968 A1 | 6/2011 | Bai et al. | |
| 2011/0153367 A1 | 6/2011 | Amigo et al. | |
| 2011/0196571 A1 | 8/2011 | Foladare et al. | |
| 2011/0202305 A1 | 8/2011 | Willis et al. | |
| 2011/0295446 A1 | 12/2011 | Basir et al. | |
| 2011/0301839 A1 | 12/2011 | Pudar et al. | |
| 2011/0307188 A1 | 12/2011 | Peng et al. | |
| 2012/0004933 A1 | 1/2012 | Foladare et al. | |
| 2012/0010906 A1 | 1/2012 | Foladare et al. | |
| 2012/0028680 A1 | 2/2012 | Breed | |
| 2012/0066007 A1* | 3/2012 | Ferrick | G06Q 30/0283 705/4 |
| 2012/0071151 A1 | 3/2012 | Abramson et al. | |
| 2012/0072243 A1 | 3/2012 | Collins et al. | |
| 2012/0072244 A1 | 3/2012 | Collins et al. | |
| 2012/0101855 A1* | 4/2012 | Collins | G06Q 40/08 705/4 |
| 2012/0109407 A1* | 5/2012 | Yousefi | H04N 7/183 701/1 |
| 2012/0109692 A1 | 5/2012 | Collins et al. | |
| 2012/0123806 A1 | 5/2012 | Schumann, Jr. et al. | |
| 2012/0172055 A1 | 7/2012 | Edge | |
| 2012/0185204 A1 | 7/2012 | Jallon et al. | |
| 2012/0197669 A1 | 8/2012 | Kote et al. | |
| 2012/0209634 A1 | 8/2012 | Ling et al. | |
| 2012/0235865 A1 | 9/2012 | Nath et al. | |
| 2012/0239471 A1 | 9/2012 | Grimm et al. | |
| 2012/0246733 A1 | 9/2012 | Schafer et al. | |

(56) References Cited

U.S. PATENT DOCUMENTS

| | | | |
|---|---|---|---|
| 2012/0258702 A1 | 10/2012 | Matsuyama | |
| 2012/0277950 A1 | 11/2012 | Plante et al. | |
| 2013/0018677 A1 | 1/2013 | Chevrette | |
| 2013/0046562 A1 | 2/2013 | Taylor et al. | |
| 2013/0116855 A1 | 5/2013 | Nielsen et al. | |
| 2013/0151202 A1* | 6/2013 | Denny et al. | 702/189 |
| 2013/0179198 A1* | 7/2013 | Bowne et al. | 705/4 |
| 2013/0218603 A1* | 8/2013 | Hagelstein et al. | 705/4 |
| 2013/0218604 A1* | 8/2013 | Hagelstein et al. | 705/4 |
| 2013/0245881 A1* | 9/2013 | Scarbrough | 701/36 |
| 2013/0289819 A1* | 10/2013 | Hassib et al. | 701/29.6 |
| 2013/0302758 A1* | 11/2013 | Wright | 434/65 |
| 2013/0304514 A1 | 11/2013 | Hyde et al. | |
| 2013/0317711 A1 | 11/2013 | Plante | |
| 2013/0317865 A1* | 11/2013 | Tofte et al. | 705/4 |
| 2014/0002651 A1* | 1/2014 | Plante | H04N 5/76 348/148 |
| 2014/0009307 A1 | 1/2014 | Bowers et al. | |
| 2014/0012492 A1 | 1/2014 | Bowers et al. | |
| 2014/0039934 A1* | 2/2014 | Rivera | 705/4 |
| 2014/0047371 A1 | 2/2014 | Palmer et al. | |
| 2014/0058761 A1 | 2/2014 | Freiberger et al. | |
| 2014/0070980 A1 | 3/2014 | Park | |
| 2014/0111647 A1* | 4/2014 | Atsmon et al. | G01C 21/34 701/533 |
| 2014/0301218 A1 | 10/2014 | Luo et al. | |
| 2015/0039350 A1 | 2/2015 | Martin et al. | |

FOREIGN PATENT DOCUMENTS

| | | |
|---|---|---|
| JP | 2002-259708 A | 9/2002 |
| WO | WO-2005/083605 A1 | 9/2005 |
| WO | WO-2010/034909 | 4/2010 |

OTHER PUBLICATIONS

Office Action in U.S. Appl. No. 14/057,467 dated Jun. 11, 2014.
Office Action in U.S. Appl. No. 14/057,419 dated Jun. 18, 2014.
Office Action in U.S. Appl. No. 14/208,626 dated Apr. 29, 2014.
Office Action in U.S. Appl. No. 14/057,408 dated May 22, 2014.
Office Action in U.S. Appl. No. 14/057,408 dated Jan. 28, 2014.
Young et al., "Cooperative Collision Warning Based Highway Vehicle Accident Reconstruction", Eighth International Conference on Intelligent Systems Design and Applications, Nov. 26-28, 2008, pp. 561-565.
Office Action in U.S. Appl. No. 14/057,467 dated Jan. 27, 2014.
Ryan Hurlbert, "Can Having Safety Features Reduce Your Insurance Premiums?", Dec. 15, 2010, 1 page.
Office Action in U.S. Appl. No. 14/057,419 dated Jan. 28, 2014.
Office Action in U.S. Appl. No. 14/057,456 dated Mar. 14, 2014.
Office Action in U.S. Appl. No. 14/057,435 dated Mar. 20, 2014.
Office Action in U.S. Appl. No. 14/057,435 dated Jul. 23, 2014.
Notice of Allowance in U.S. Appl. No. 14/057,408 dated Sep. 25, 2014.
Office Action in U.S. Appl. No. 14/057,419 dated Oct. 9, 2014.
Office Action in U.S. Appl. No. 14/057,467 dated Oct. 17, 2014.
Office Action in U.S. Appl. No. 14/057,456 dated Oct. 28, 2014.
Office Action in U.S. Appl. No. 14/057,435 dated Nov. 18, 2014.
Office Action in U.S. Appl. No. 14/208,626 dated Aug. 13, 2014.
Office Action in U.S. Appl. No. 14/208,626 dated Dec. 23, 2014.
Office Action in U.S. Appl. No. 14/057,456 dated Mar. 17, 2015.
Office Action in U.S. Appl. No. 14/057,467 dated Feb. 23, 2015.
Office Action in U.S. Appl. No. 14/057,419 dated Mar. 31, 2015.
Office Action in U.S. Appl. No. 14/057,435 dated May 29, 2015.
Office Action in U.S. Appl. No. 14/718,338 dated Jul. 7, 2015.
Office Action in U.S. Appl. No. 14/887,580 dated Apr. 7, 2016.
Office Action in U.S. Appl. No. 14/950,492 dated May 3, 2016.
Office Action in U.S. Appl. No. 14/057,467 dated Mar. 16, 2016.
Office Action in U.S. Appl. No. 14/950,492 dated Jan. 22, 2016.
Office Action in U.S. Appl. No. 14/057,456 dated Jun. 16, 2016.
Office Action in U.S. Appl. No. 14/057,467 dated Jul. 1, 2016.
Office Action in U.S. Appl. No. 14/057,456 dated Mar. 9, 2017.
Office Action in U.S. Appl. No. 14/887,580 dated Mar. 21, 2017.
Office Action in U.S. Appl. No. 14/057,467 dated Apr. 6, 2017.
Office Action in U.S. Appl. No. 14/887,580 dated Oct. 18, 2016.
Office Action in U.S. Appl. No. 14/057,467 dated Dec. 7, 2016.
Carroll et al. "Where Innovation is Sorely Needed", http://www.technologyreview.com/news/422568/where-innovation-is-sorely-needed/?nlid, retrieved from the internet on Nov. 4, 2013, 3 pages.
"Integrated Vehicle-Based Safety Systems (IVBSS)", Research and Innovative Technology Administration (RITA), http://www.its.dot.gov/ivbss/, retrieved from the internet on Nov. 4, 2013, 3 pages.

\* cited by examiner

VEHICLE SENSOR COLLECTION OF OTHER VEHICLE INFORMATION

TECHNICAL FIELD

The present application relates generally to vehicular sensor information and, more specifically, to systems and methods for collecting and processing sensor data to gather information about another vehicle.

BACKGROUND

Providers of vehicle insurance are generally reliant on business models in which accurate information is essential, but rarely obtainable with a high degree of confidence. For example, insurance premiums may be based on insurance ratings that reflect an expected risk of loss for a particular individual, and yet, with the exception of driving records showing past moving violations, the insurer is typically unaware of the individual's driving behaviors. As another example, the manner in which insurance claims are settled often depends on which party is at fault for an accident. In at least some instances, however, it may be difficult to determine the identity of the party at fault for the accident, and therefore difficult to shift costs to the appropriate party. As still another example, insurance providers would generally benefit from soliciting individuals who are not current policy holders, but drive vehicles within a given state or region. It may be difficult, however, to ascertain accurate information of that sort from public records, and therefore difficult to narrowly tailor sales and/or marketing efforts.

DETAILED DESCRIPTION

Figure 1:
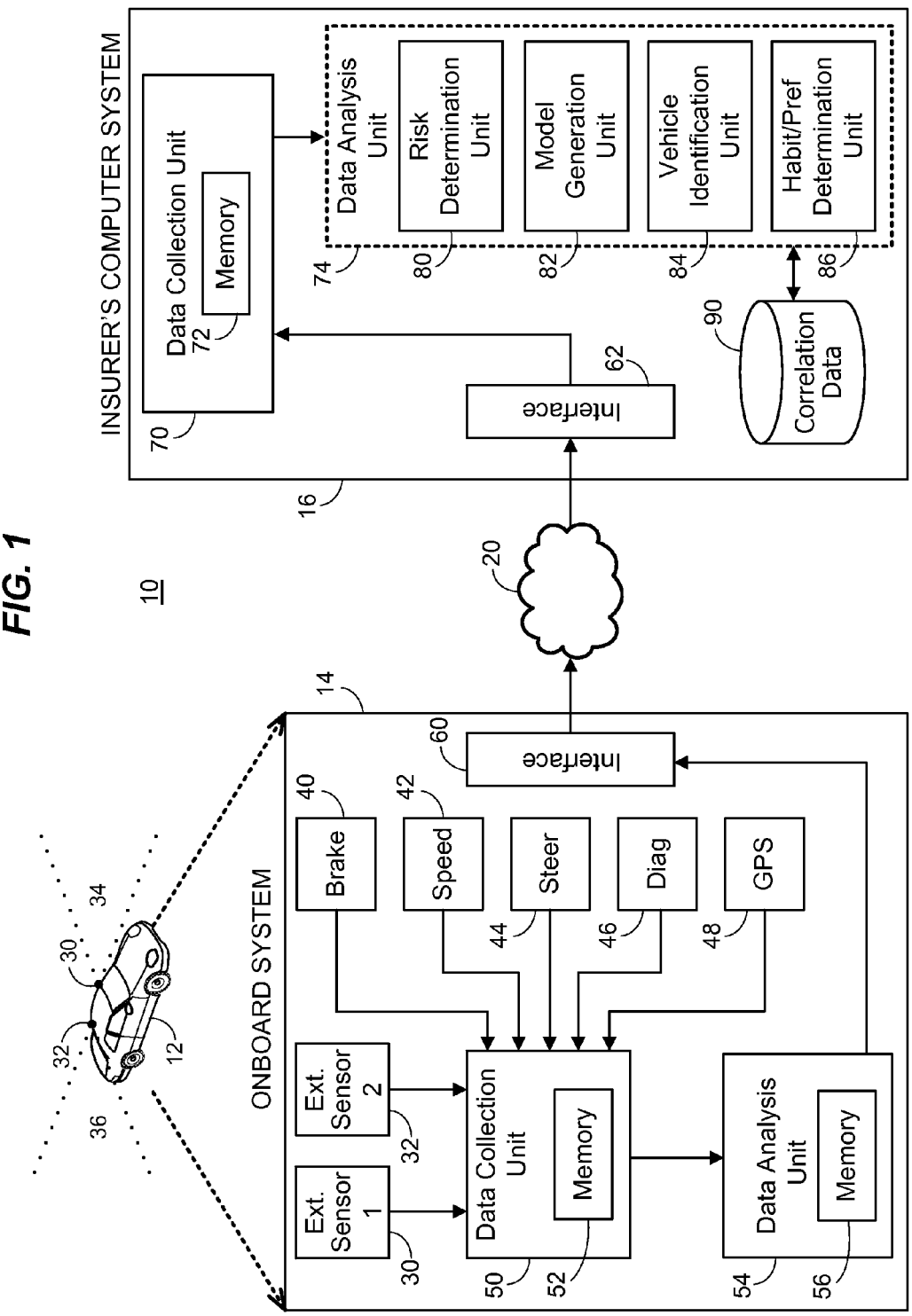
FIG. 1 is a block diagram of an example system for collecting and processing data obtained from a vehicle for various insurance-related or other purposes.

The disclosed system collects data from one or more sensors and/or subsystems onboard a vehicle, and analyzes the collected data for any of various purposes according to different embodiments. The onboard vehicular data may reflect information generated by any of various devices or subsystems of a vehicle, such as devices that sense physical characteristics of the environment external to the vehicle (e.g., still image cameras, video cameras, lidar, radar, etc.), devices that monitor and/or control operational parameters of the vehicle (e.g., speed, braking, whether a conventional cruise control or other automated driving system is activated, etc.), navigational devices (e.g., dedicated global positioning system (GPS) devices, smartphones with applications that locate the smartphone using GPS or cell tower triangulation, etc.), diagnostic systems, etc.

In some embodiments, the onboard vehicular data is collected and processed remotely from the vehicle. In one embodiment, for example, data representing information collected by an external sensor, such as a video camera or lidar device, is provided to an insurer's computer system, where the data is processed to generate a virtual model of an event (e.g., an accident involving the vehicle and/or a different vehicle). Once the virtual model is generated, it may be displayed to a user of the system in order to ascertain fault or estimate damages, for example. Operational data from the vehicle (e.g., data indicative of speed, braking, electronic warnings, etc.) may also be provided to the insurer's computer system for processing in order to enhance the virtual model, by providing an information overlay (e.g. a speed indicator on the displayed virtual model), greater detail in the virtual model, and/or greater accuracy of the virtual model. Moreover, synchronization data such as time stamps may be provided to the insurer's computer system so that the virtual model may accurately reflect which portions of the external sensor data correspond, in time, with the different portions of the operational data.

Alternatively, external sensor data from a first vehicle may be provided to an insurer's computer system for processing in order to identify characteristics of a different, second vehicle in the vicinity of the first vehicle (i.e., within the sensor range). The insurer's computer system may then use the identifying characteristics of the second vehicle for various purposes, such as determining whether the second vehicle is currently insured, identifying a party that is responsible for an accident, and/or assessing risk for the driver of the second vehicle. As another alternative, sensor data or operational data from a vehicle may be provided to an insurer's computer system (or another entity's computer system) for processing in order to determine a habit or preference of the driver, which may in turn be used to select an advertisement specifically targeted to the driver.

In other embodiments, the onboard vehicular data is collected and processed at the vehicle. In some of these embodiments, external sensor data is collected and processed at the vehicle substantially in real-time. For example, onboard processing of external sensor data may be used to determine risk indicators reflecting how safely the operator of the vehicle is driving during different time periods. The risk indicators may then be provided to the insurer's computer system at a later time in order to determine different premiums for the driver that correspond to the different time periods. The risk indicators may be based in whole or in part on operational data indicating when the vehicle is driven with an active automated driving system, such as a conventional cruise control system or a fully automated (i.e., full machine control) driving system, for example. In other embodiments, onboard processing of external sensor data may be used to identify particular types of events, such as accidents, with onboard data only being sent to the insurer's computer system when such an event is detected. In this manner, the volume of data sent to the insurance provider can be greatly reduced, thereby reducing the length and/or bandwidth of data transmissions, and/or reducing storage and processing requirements for the insurer's computer system.

FIG. 1 is a block diagram of an example system 10 for collecting and processing data obtained from a vehicle 12 for various insurance-related or other purposes. While FIG. 1 depicts vehicle 12 as an automobile, vehicle 12 may instead be a truck, motorcycle, or any other type of land-based vehicle capable of carrying at least one human passenger (including the driver). Vehicle 12 includes an onboard system 14, which comprises various different subsystems arranged within and/or on the exterior of vehicle 12. The onboard system 14 is in communication with an insurer's computer system 16 via a network 20. The network 20 may be a single network, or may include multiple networks of one or more types (e.g., a cellular telephone network, a wireless local area network (WLAN), the Internet, etc.).

The onboard system 14 includes a first external sensor 30 and a second external sensor 32. Each of external sensors 30, 32 is a device configured to sense an environment external to vehicle 12 (i.e., to sense physical characteristics of the environment external to vehicle 12), such as a still image or video camera device, a lidar (laser remote sensing) device, a radar device, or a sonar device, for example. Each of the external sensors 30, 32 may be located on or inside vehicle 12. For example, one or both of the external sensors 30, 32 may be permanently affixed to vehicle 12 (e.g., on the exterior or interior of the frame, on the dashboard, on the inner or outer surface of a windshield, etc.), or may be temporarily affixed to, or simply placed on or in, some portion of the vehicle 12 (e.g., placed on top of the dashboard, or in a device holder affixed to the windshield, etc.). External sensor 30 and/or external sensor 32 may be included in a general purpose computing device (e.g., as a software application and associated hardware of a smartphone or other portable computer device), or may be a dedicated sensor device. In the example system 10 shown in FIG. 1, external sensor 30 is located on or inside vehicle 12 such that it senses the environment in a forward-facing range 34, while external sensor 32 is located on or inside vehicle 32 such that it senses the environment in a rear-facing range 36. In some embodiments, the external sensor 30 and external sensor 32 combine to provide a 360 degree sensing range. In other embodiments, however, the external sensor 30 and external sensor 32 are redundant sensors (of the same type, or of different type) that each provide a 360 degree sensing range. In still other embodiments, external sensor 32 is omitted, or the onboard system 14 includes more than two external sensors.

Each of external sensors 30, 32 generates data, or analog information, that is indicative of the sensed external environment. In an embodiment where external sensor 30 is a digital video camera device, for example, external sensor 30 generates data corresponding to frames of captured digital video. As another example, in an embodiment where external sensor 30 is an analog camera device, external sensor 30 generates analog signals corresponding to frames of captured analog video. As yet another example, in an embodiment where external sensor 30 is a digital lidar device, external sensor 30 generates data corresponding to frames of captured digital lidar information.

The onboard system 14 also includes hardware, firmware and/or software subsystems that monitor and/or control various operational parameters of vehicle 12. In the example system 10 of FIG. 1, a braking subsystem 40 generates data indicative of how the brakes of vehicle 12 are applied (e.g., an absolute or relative measure of applied braking force, or a binary indicator of whether the brakes are being applied at all, etc.), a speed subsystem 42 generates data indicative of how fast the vehicle 12 is being driven (e.g., corresponding to a speedometer reading, or corresponding to a driver input such as depression of a gas pedal, etc.), a steering subsystem 44 generates data indicative of how the vehicle 12 is being steered (e.g., based on the driver's manipulation of a steering wheel, or based on automated steering control data, etc.), and a diagnostics subsystem 46 generates other information pertaining to the operation of vehicle 12, such as warning information to indicate dangerous or improper operation, and/or error codes to indicate software and/or hardware malfunctions within vehicle 12. The example system 10 also includes a GPS subsystem 48 that generates data indicative of a current location of vehicle 12. In other embodiments, the subsystem 48 uses other positioning techniques instead of GPS, such as cell tower triangulation, for example.

In some embodiments, the braking subsystem 40, speed subsystem 42, steering subsystem 44, diagnostics subsystem 46, and/or a different subsystem not shown in FIG. 1 also generate(s) data indicating whether one or more automated driving systems are currently activated for vehicle 12. For example, the speed subsystem 42 may generate data indicating whether a conventional cruise control system is currently activated, and/or the braking subsystem 40 or steering subsystem 44 may generate data indicating whether assisted steering and/or assisted braking systems are currently activated. As other examples, a unit of onboard system 14 (e.g., diagnostics subsystem 46, or another unit not shown in FIG. 1) may generate data indicating whether vehicle 12 is in an automated transmission mode or a manual transmission mode, or whether the driving of vehicle 12 is currently subject to complete automated/machine control rather than manual (human) control, etc. In yet another example, a unit of onboard system 14 not shown in FIG. 1 (or a combination of units, such as a combination that includes subsystems 40 and 42) may generate data indicative of motion of the vehicle 12 relative to all six degrees of freedom (i.e., forward/backward, up/down, left/right, pitch, yaw, and roll). For example, the generated data may indicate translational and rotational G-forces (e.g., using accelerometers), which can be used to deduce directional speed and acceleration with respect to each degree of freedom.

In some embodiments, the onboard system 14 does not include one or more of the subsystems 40, 42, 44, 46 and 48, and/or the onboard system 14 includes additional devices or subsystems not shown in FIG. 1. Moreover, one or more subsystems in onboard system 14 may be included in a general purpose computing device such as a smartphone. For example, the GPS subsystem 48 may include a software application running on a smartphone that includes the appropriate hardware (e.g., an antenna and receiver).

The onboard system 14 also includes a data collection unit 50 configured to receive data and/or analog signals from the external sensors 30, 32 and from subsystems 40, 42, 44, 46 and 48. The data collection unit 50 may collect the data and/or analog signals substantially in real time, and in any of various different ways, according to different embodiments. In some embodiments, for example, the data collection unit 50 periodically samples data and/or analog signals from the various external sensors 30, 32 and subsystems 40, 42, 44, 46 and 48, or is notified by the respective sensors or subsystems when new data is available, etc. In some embodiments, the data collection unit 50 also ensures that data from the various external sensors 30, 32 and subsystems 40, 42, 44, 46 and 48 can be synchronized, e.g., by generating a time stamp for each sampled data point, or by storing in memory 52 time stamps that are received from the external sensors 30, 32 and/or subsystems 40, 42, 44, 46 and 48 along with the corresponding data points.

In some embodiments, the data collection unit 50 receives data from one or more of the external sensors 30, 32 and/or subsystems 40, 42, 44, 46 and 48 via a wireless link, such as a Bluetooth link. Alternatively, one or more of subsystems 40, 42, 44, 46 and 48, and/or external sensors 30 and/or 32, may provide data to data collection unit 50 via messages placed on a controller area network (CAN) bus (not shown in FIG. 1) or other suitable bus type. In still other embodiments, one or more of subsystems 40, 42, 44, 46 and 48 provide data to data collection unit 50 via an onboard diagnostics (OBD) system (also not shown in FIG. 1). For example, the data collection unit 50 may collect information from diagnostics subsystem 46 (and/or from one or more of subsystems 40, 42 and 44) via one or more OBD ports. In some embodiments, the data collection unit 50 collects data using a mix of interface and/or bus types (e.g., a Bluetooth interface to receive data from sensors 30, 32, an OBD port to receive data from diagnostics subsystem 46, and a CAN bus to receive data from subsystems 40, 42, 44).

In some embodiments where one or more of external sensors 30, 32 and/or one or more of subsystems 40, 42, 44, 46 and 48 generate analog signals, either the respective sensors/subsystems or the data collection unit 50 converts the analog information to a digital format. Moreover, the data collection unit 50 may convert data received from one or more of external sensors 30, 32, and/or one or more of subsystems 40, 42, 44, 46 and 48, to different digital formats or protocols. After collecting (and possibly converting) the data from the various sensors/subsystems, the data collection unit 50 stores the data in a memory 52. The memory 52 may be any suitable type of data storage, such as a random access memory (RAM), a flash memory, or a hard drive memory, for example.

In some embodiments, the data collection unit 50 also, or instead, collects information directly by detecting a manual input by an operator of the vehicle 12. For example, the data collection unit 50 may directly detect when a human driver has performed a particular operation, such as applying the brakes, turning the steering wheel, pressing a button or toggling a switch to turn on a fully automated/machine driving mode, etc. In such embodiments, the mechanisms or circuits that allow detection of the manual inputs may be viewed as portions of one or more of subsystems 40, 42, 44, 46 and/or 48. For example, a physical button or switch having a state that indicates whether an operator has turned on a conventional cruise control system may be viewed as a part of speed subsystem 42. Thus, it is understood that references below to data, signals, or other information provided by subsystems 40, 42, 44, 46 and/or 48 may encompass, in some embodiments, direct indicators of operations performed manually by a human driver. Similarly, in some embodiments and/or scenarios where the operation of vehicle 12 is fully or partially machine-controlled, references below to information provided by subsystems 40, 42, 44, 46 and/or 48 may encompass direct indicators of operations performed automatically by the machine controller.

In some embodiments, data collection unit 50 also takes advantage of other sources, external to the vehicle 12, to collect information about the environment. The use of such sources allows the data collection unit 50 to collect information that may be hidden from sensors 30, 32 (e.g., information about distant objects or conditions outside the range of sensors 30, 32, or information about objects or conditions that are not in a line-of-sight path of sensors 30, 32), and/or to collect information that may be used to confirm (or contradict) information obtained by sensors 30, 32. For example, onboard system 14 may include one or more interfaces and antennas (not shown in FIG. 1), such as Dedicated Short Range Communications (DSRC) interfaces and antennas, that are configured to receive wireless signals using one or more "V2X" technologies, such as vehicle-to-vehicle ("V2V"), vehicle-to-infrastructure ("V2I") and/or vehicle-to-pedestrian ("V2P") technologies. In an embodiment in which onboard system 14 is configured to receive wireless signals from other vehicles using V2V, for example, the data collection unit 50 may receive data sensed by one or more external sensors (e.g., similar to external sensors 30, 32) of one or more other vehicles, such as data indicating the configuration of a street, or the presence and/or state of a traffic control indicator, etc. In an example embodiment in which onboard system 14 is configured to receive wireless signals from infrastructure using V2I, the data collection unit 50 may receive data provided by infrastructure elements having wireless capability, such as dedicated roadside stations or "smart" traffic control indicators (e.g., speed limit postings, traffic lights, etc.), for example. The V2I data may be indicative of traffic control information (e.g., speed limits, traffic light states, etc.), objects or conditions sensed by the stations, or may provide any other suitable type of information (e.g., weather conditions, traffic density, etc.). In an example embodiment in which onboard system 14 is configured to receive wireless signals from pedestrians using V2P (or from a cyclist using similar technology), the data collection unit 50 may receive data sent from a smartphone, such as the location of the smartphone (and thus, the location of the person carrying the smartphone), objects or conditions sensed by the smartphone, or any other suitable type of information. The onboard system 14 may receive V2X data simply by listening/scanning for the data, or may receive the data in response to a wireless request sent by the onboard system 14, for example. More generally, the onboard system 14 may be configured to receive information about external objects and/or conditions via wireless signals sent by any capable type of external object or entity, such as a pedestrian, cyclist or driver operating a smartphone, another vehicle, an infrastructure element (e.g., a roadside wireless station), a commercial or residential location (e.g., a locale maintaining a WiFi access point), etc.

The onboard system 14 also includes a data analysis unit 54 that is coupled to the data collection unit 50. The data analysis unit 54 may include one or more processors, and is configured to process the data collected by data collection unit 50 and stored in memory 52 for various purposes according to different embodiments, as discussed further below. The data analysis unit 54 includes a memory 56 for storing outputs of the data analysis, which may be any suitable type of data storage, such as a RAM, a flash memory, or a hard drive memory, for example.

The data analysis unit 54 is coupled to an interface 60, which transmits the data received from data analysis unit 54 to the insurer's computer system 16 via the network 20. The interface 60 may include a transmitter and one or more antennas, for example. In one embodiment, the interface 60 is included in a general purpose computing device such as a smartphone. For example, the data analysis unit 54 may be coupled to interface 60 via a Bluetooth link to a smartphone device. In an alternative embodiment, the interface 60 is instead an interface to a portable memory device, such as a portable hard drive or flash memory device. In this embodiment, the portable memory device may be used to download data from memory 56 of data analysis unit 54, and may be manually carried to the insurer's computer system 16 without utilizing network 20. Alternatively, the portable memory device, or a Bluetooth link, may be used to download data from memory 56 to a field agent's computer device (e.g., laptop or smartphone), which may in turn be used to transmit the data to the insurer's computer system 16 via network 20.

Data analysis unit 54 and data collection unit 50 may jointly operate to perform various different functions according to different embodiments. In one embodiment, data collection unit 50 buffers a certain amount of real-time data collected from external sensors 30, 32 and subsystems 40, 42, 44, 46 and 48 (e.g., data collected over the previous two minutes, or the previous ten seconds, etc.) by storing the data in memory 52, and data analysis unit 54 sends all or a portion of the buffered data to interface 60 when detecting a particular event such as an accident. Data analysis unit 54 may detect the accident or other event by processing the sensor and/or subsystem data. In one embodiment, for example, data analysis unit 54 detects an accident by processing data from speed subsystem 42 to identify a very sudden change in velocity of vehicle 12, and/or by implementing image/video processing of data from external sensors 30, 32 to identify a collision with another vehicle or object, etc. Once the buffered data is transmitted to the insurer's computer system 16, further processing of the data may be performed (e.g., to generate a virtual model of the accident or other event), as discussed further below. In an embodiment, data indicating that the accident or other event was detected is sent to interface 60 (and the insurer's computer system 16) along with the buffered data.

Additionally, or alternatively, data analysis unit 54 may process data collected by data collection unit 50 and stored in memory 52, and store results relating to that processing in memory 56. In one such embodiment, data analysis unit 54 processes external sensor data and/or subsystem data substantially in real-time (e.g., as the data is collected by data collection unit 50) in order to generate risk indicators reflecting the level of risk associated with the conditions or environment in which the vehicle is driven, and/or the operation of the vehicle, during different time periods. Examples of ways in which risk indicators may be determined, and of the types of correlation models/data that may be used to determine the risk indicators, are discussed below in connection with the insurer's computer system 16. Once each risk indicator is generated for a particular time period, the risk indicator may be stored in memory 56, and the data in memory 52 that corresponds to that same time period may be erased to make room for new data. In this manner, storage requirements of memory 52 may be reduced, which may be useful in view of the large volume of data that may be generated by external sensors 30, 32 and subsystems 40, 42, 44, 46 and 48, and/or received from external sources via wireless technologies such as V2X. Memory 52 and memory 56 may be separate memories, or parts of a single memory, according to different embodiments.

In some embodiments, the data generated by data analysis unit 54 and stored in memory 56 (e.g., data reflecting risk indicators corresponding to respective time periods) is automatically sent to interface 60 for transmission to the insurer's computer system 16. For example, the data may be sent to interface 60 at regular time intervals (e.g., once per day, once per insurance billing cycle, etc.). In other embodiments, the data is sent to the insurer's computer system 16 in response to a query from the insurer's computer system 16 that is received via network 20, or in any other suitable manner. Once the data is provided to the insurer's computer system 16, the data may be subject to further processing (e.g., to determine an insurance rating and/or premium based on risk indicators generated by data analysis unit 54), as discussed further below.

As noted above, one or more of subsystems 40, 42, 44, 46 and 48, and/or one or both of external sensor 30, 32, may provide data to data collection unit 50 via a bus, such as a CAN bus. In some embodiments, however, other components within onboard system 14 are also connected to the bus. For example, sensors 30, 32, subsystems 40, 42, 44, 46 and 48, data collection unit 50, data analysis unit 54, and interface 60 may all communicate via CAN bus messages.

The insurer's computer system 16 is an electronic processing system capable of performing various functions, and includes an interface 62 configured to receive data from the onboard system 14 of vehicle 12 via network 20. Interface 62 may be similar to interface 60 of the onboard system 14, for example. In embodiments where a portable memory device (rather than network 20) is used to transfer data from the onboard system 14 to the insurer's computer system 16, interface 62 is an interface to a portable memory device, such as a portable hard drive or flash memory device, for example.

The insurer's computer system 16 also includes a data collection unit 70 coupled to interface 62. The data collection unit 70 is configured to receive/collect the data received by interface 62, and to store the collected data in a memory 72. The memory 72 may be any suitable type of data storage, such as a RAM, a flash memory, or a hard drive memory, for example. The data collection unit 70 is coupled to a data analysis unit 74. Data analysis unit 74 may include one or more processors, and is configured to process the data collected by data collection unit 70 and stored in memory 72 for various purposes according to different embodiments, as discussed further below.

In the example system 10 of FIG. 1, the data analysis unit 74 includes a risk determination unit 80, a model generation unit 82, a vehicle identification unit 84, and a habit/preference determination unit 86. In other embodiments, data analysis unit 74 does not include one or more of units 80, 82, 84 and 86, and/or includes additional processing units not shown in FIG. 1. In one embodiment where risk indicators are only generated by data analysis unit 54 of the onboard system 14, for example, risk determination unit 80 is omitted from data analysis unit 74. In one embodiment, each of units 80, 82, 84 and 86 includes a set of instructions stored on a tangible, nontransitory computer-readable medium and capable of being executed by the processor(s) of data analysis unit 74 to perform the functions described below. In another embodiment, each of units 80, 82, 84 and 86 includes a set of one or more processors configured to execute instructions stored on a tangible, nontransitory computer-readable medium to perform the functions described below. In an embodiment, data analysis unit 74 includes a memory (not shown in FIG. 1) for storing outputs of the analysis performed by data analysis unit 74.

In some embodiments, the risk determination unit 80 is configured to generate risk indicators based on data from external sensors 30, 32 and/or subsystems 40, 42, 44 and/or 46, and/or based on data received from an external source by onboard system 14 (e.g., using V2X technology). For example, the risk determination unit 80 may generate risk indicators in an alternative embodiment where data analysis unit 54 is omitted or otherwise does not determine the risk indicators. Alternatively, in one embodiment where data analysis unit 54 of the onboard system 14 does determine risk indicators, risk determination unit 80 processes data representing the risk indicators in order to generate other indicia of risk (e.g., to generate monthly risk indicators based on per-minute or per-day risk indicators that are provided by onboard system 14). In one embodiment where data analysis unit 54 determines risk indicators, risk determination unit 80 is not included in data analysis unit 74.

Risk indicators may be determined using predictive modeling, which may use data reflecting information collected from external sensors 30, 32, subsystems 40, 42, 44 and/or 46, and/or V2X communications, as well as correlation data 90 stored in the insurer's computer system 16. The correlation data 90 can be accessed by the risk determination unit 80, and/or other units within data analysis unit 74. In other embodiments (e.g., some embodiments where data analysis unit 54 generates risk indicators, as discussed above), similar correlation data is instead stored, or is in part stored, in the onboard system 14 (e.g., in memory 52 or memory 56). In some of these latter embodiments, correlation data similar to correlation data 90 is stored in the memory of onboard system 14 at the time of installation in vehicle 12, and/or the correlation data stored in the memory of onboard system 14 is updated on a regular or irregular basis (e.g., via wireless communications, or by field agents transferring data to the onboard system 14 via a portable memory device, etc.).

The correlation data 90 may be generated based on historical data associated with other vehicles. In some embodiments, correlation data 90 includes data modeling correlations between (a) patterns relating to external conditions sensed by external vehicle sensors and/or indicated by V2X signals received by vehicle 12, and/or patterns relating to vehicle operation as represented by external sensor data, operational data, and/or received V2X signals, and (b) likelihoods of incurring recognizable losses under a vehicle insurance policy. The correlation data/models stored in correlation data 90 may be based on manually entered information, or may be learned by the insurer's computer system 16 (or another computer system not shown in FIG. 1) based on vehicle data and claims data of a plurality of other vehicles, e.g., as described in more detail below in connection with FIG. 8.

The risk determination unit 80 may be configured to analyze the vehicle data stored in memory 72 using one or more of these correlation models in order to determine one or more risk indicators. As an example in which a relatively simple correlation model is used, the risk determination unit 80 may compare the percentage of time, within a particular time period, that the vehicle 12 was operated in a fully automated/machine driving mode (e.g., as determined based on data generated by one or more of subsystems 40, 42, 44 and 46 of FIG. 1) with one or more percentage ranges identified by the correlation data (e.g., 0-10 percent, 11-25 percent, etc.), and determine, for that time period, the risk indicator that corresponds to the matching percentage range. The correlation data 90 may include a relational database, for example, with each percentage range corresponding to a different indicator of a loss likelihood. As another example utilizing a slightly more complex correlation model, the risk determination unit 80 may process data from speed subsystem 42 and data from external sensor 30 to determine the average speed of vehicle 12, and the average following distance between vehicle 12 and vehicles ahead of vehicle 12, over a particular time period. Once average speed and average following distance are determined, risk determination unit 80 may compare those quantities with speed/following distance models represented by the correlation data, and identify, for that time period, a risk indicator that corresponds to the average speed/following distance of vehicle 12.

More generally, risk determination unit 80 may process data collected from external sensor 30 and/or external sensor 32 (alone, in conjunction with data collected from one or more of subsystems 40, 42, 44, 46 and 48, and/or in conjunction with information provided by V2X or other wireless signals received by vehicle 12) to determine when vehicle 12 crossed lane markers, was not operated in conformance with traffic lights or traffic signs, was driven at erratic speeds, was driven with excessive braking, or was otherwise driven in any other manner that has previously been determined (e.g., by the insurance provider) to correspond to a higher (or lower) risk of accident/loss, or to determine when vehicle 12 was driven in low-visibility conditions (e.g., rainy or snowy weather), in a high-traffic environment, on streets in disrepair (e.g., bumpy, full of pot holes, etc.), or in any other conditions external to vehicle 12 that have previously been determined to correspond to a higher (or lower) risk of accident/loss. Determination of risk indicators such as those generated by data analysis unit 54 and/or risk determination unit 80, and the determination of correlation models such as those that may be stored within correlation data 90, are discussed further below in connection with FIGS. 8-10.

Once the risk indicators are determined by data analysis unit 54 and/or risk determination unit 80, the insurer's computer system 16 may provide the risk indicators to an insurance rating unit (not shown in FIG. 1), within the insurer's computer system 16 or another computer system, that is configured to determine an insurance rating for a driver of vehicle 12 based on the risk indicators. For example, in an embodiment where data analysis unit 54 and/or risk determination unit 80 generate periodic (e.g., weekly, monthly, etc.) risk indicators, the insurance rating unit may determine an insurance rating corresponding to one or more of the risk indicators (e.g., a monthly insurance rating corresponding to a monthly risk indicator, a monthly insurance rating corresponding to a set of tens or hundreds of hourly risk indicators, an annual insurance rating corresponding to a set of 52 weekly risk indicators, etc.). The insurance ratings may in turn be provided to a billing unit (also not shown in FIG. 1), within the insurer's computer system 16 or another computer system, that is configured to determine premiums for an insurance policy of the driver of vehicle 12 based on the insurance ratings (or, alternatively, based directly on the risk indicators). As just one example, in an embodiment where data analysis unit 54 and/or risk determination unit 80 generate monthly risk indicators, and where an insurance rating unit determines corresponding monthly insurance ratings, the billing unit may determine a monthly insurance premium corresponding to each monthly insurance rating.

Each risk indicator may include a single value or code, or a plurality of risk indices. In one embodiment, for example, a monthly risk indicator includes risk indices that are generated each hour (or each hour when vehicle 12 is operated, etc.), and a monthly rating and premium are determined based on all of the hourly risk indices generated for the respective month. The hourly risk indices may be weighted (e.g., according to the amount of time that vehicle was driven during that hour), or raw risk indices may be used to determine the rating and premium. In some embodiments and scenarios, vehicle 12 is driven by an individual not yet insured by the insurance provider, and the risk indicators are used to determine an insurance rating and corresponding premium to be offered to the driver of vehicle 12.

The model generation unit 82 is configured to process data from external sensor 30 and/or external sensor 32 in order to generate a virtual model. The virtual model can be used to visually re-create an accident or other event involving vehicle 12, or an accident or other event that does not involve vehicle 12, but is sensed by one or both of the external sensors 30, 32 of vehicle 12. As discussed above, for example, the onboard system 14 may detect when an accident involving vehicle 12 has occurred, and send buffered data to the insurer's computer system 16 in response to detecting the accident.

In one example embodiment, the virtual model generated by model generation unit 82 is an animated re-creation of the event. For example, the model generation unit 82 may process the external sensor data to render a three-dimensional temporal model of the environment of vehicle 12, which may depict the conditions, over time, of an accident that involved or occurred near vehicle 12 (e.g., configuration of a street on which vehicle 12 is driving, other vehicles in the vicinity of vehicle 12, traffic signs or lights near vehicle 12, weather conditions around vehicle 12, etc.). In some embodiments, operational data from one or more of subsystems 40, 42, 44 and/or 46, and/or information obtained by vehicle 12 from external sources, is/are also processed by model generation unit 82. For example, the operational data (e.g., braking data from braking subsystem 40, velocity data from speed subsystem 42, etc.) and/or external source information (e.g., V2X information indicating locations of pedestrians, cyclists and/or vehicles, state of a traffic light, etc.) may be used in order to improve or confirm the accuracy of the animated re-creation. Accuracy may be improved, for example, by using the operational data and/or external source information to fill in gaps or provide greater confidence in the data provided by external sensors 30, 32. In one such embodiment and scenario, information that vehicle 12 had obtained from external sources (e.g., using V2X technology) is utilized to generate portions of the animated re-creation that cannot be determined by data from external sensors 30, 32 (e.g., due to the corresponding geographic areas being out of the range or line of sight of external sensors 30, 32).

Alternatively, or additionally, the model generation unit 82 may generate an animated re-creation of the event that distinctly displays (e.g., in a graphic overlaying the animated re-creation) one or more parameters represented by the operational data and/or external source information. For example, the model generation unit 82 may generate a virtual model such that an animated re-creation of the event can be displayed with an indicator of speed (and/or other operational parameters) of vehicle 12 overlaid on the animated re-creation, or with an indicator of current weather (or other environmental) conditions overlaid on the animated recreation, etc.

In another example embodiment, the virtual model generated by model generation unit 82 comprises data representing the raw sequence of frames produced by the external sensor(s), and therefore provides the same perspective as the external sensor(s) that captured the frame data. In an embodiment where external sensor 30 is a video camera device situated such that it captures the driver's field of vision, for example, the virtual model may be a temporal model that depicts the nearly ground-level perspective of the driver of vehicle 12 while the accident or other event is occurring and/or about to occur. As another example, the virtual model may be a temporal model that depicts a panoramic view taken by knitting together frames captured by external sensor 30 and frames captured by external sensor 32 while the accident or other event is occurring and/or about to occur. The model generation unit 82 may also process operational data from one or more of subsystems 40, 42, 44 and/or 46, and or data received by vehicle 12 from one or more external sources (e.g., using V2X technology), to generate a virtual model such that the frames are displayed together with indicators of one or more operational parameters (e.g., speed) of vehicle 12, and/or one or more other indicators (e.g., weather conditions or visibility) overlaid on the frames.

In embodiments where indicators of operational parameters (and/or other information) are displayed along with captured frames or an animated re-creation, or where operational data and/or external source (e.g., V2X) information is used to increase the accuracy of an animated re-creation, the model generation unit 82 may use synchronization data received from onboard system 14 (e.g., time stamps that were initially received and/or generated by data collection unit 50) to ensure that the operational parameters and/or other information are properly synchronized to the captured frames or the animated re-creation. An example of a virtual model that provides an animated re-creation of an accident is discussed below in connection with FIGS. 2 and 3, and various methods of utilizing external vehicle sensor data to generate a virtual model of an event are discussed further below in connection with FIGS. 4-6.

Once a virtual model is generated by model generation unit 82, the virtual model (e.g., captured frames with operational parameters or other information overlaid, or an animated re-creation with or without overlaid information, etc.) may be displayed to a user of the insurer's computer system 16 (or other computer system not shown in FIG. 1), who may then study the displayed virtual model in order to help determine fault for the accident, determine an initial estimate of damages resulting from the accident, or take other action (e.g., attempt to contact medical assistance, and/or the driver's cell phone, after determining that the vehicle 12 was involved in a crash).

In the example system 10, the insurer's computer system 16 is also configured to utilize information obtained by one or both of external sensors 30, 32 of vehicle 12 to determine information pertaining to a different, second vehicle within sensor range 34 and/or 36. While various different kinds of information relating to the second vehicle may be collected by the insurer's computer system 16 (e.g., how the second vehicle is being driven, the conditions in which the second vehicle is driven, etc.), that information may be of limited value unless the second vehicle, and therefore the owner and/or driver of the second vehicle, can be identified. For example, a risk level associated with a driver of the second vehicle (e.g., as determined based on driving conditions and/or habits captured by external sensors 30, 32) may be of limited use unless an insurance company can identify an owner/driver of the second vehicle (e.g., in order to update an insurance rating for the owner/driver of the second vehicle, etc.). Further, some applications may more directly rely on identification of the second vehicle. For example, it may be useful to identify a party at fault for an accident (e.g., in a scenario where, based on a visualization of an accident provided by model generation unit 82, a user of the insurer's computer system 16 has determined that the driver of the second vehicle caused the accident), or to determine whether an owner/driver of the second vehicle is insured (e.g., based on identification of a license plate number of the second vehicle).

To determine identifying characteristics of a second vehicle within range 34 of external sensor 30 and/or range 36 of external sensor 32, the vehicle identification unit 84 processes data from external sensor 30 and/or external sensor 32. For example, vehicle identification unit 84 may utilize image processing of images/frames captured by a still image camera, video camera, or lidar device, located on or inside vehicle 12 in order to determine a license plate number for the other vehicle, and/or other identifying characteristics such as state where the vehicle is registered (e.g., as printed on the license plate), or the color, year, make and/or model of the vehicle. In some embodiments, vehicle identification unit 84 (or another unit within or outside of the insurer's computer system 16) makes one or more additional determinations based on the initially determined information. For example, vehicle identification unit 84 (or another unit) may determine a selection of possible license plate numbers that each correspond to an identified color, make, model and/or year of a vehicle. To this end, vehicle identification unit 84 (or another unit) may access correlation data 90, or another local or remote database not shown in FIG. 1, which may correlate various types of identifying information with other information (e.g., license plate numbers to color, make, model and/or year). A method of utilizing external vehicle sensor data to determine identifying characteristics of another vehicle is discussed further below in connection with FIG. 7.

In the example system 10, the insurer's computer system 16 is also configured to determine habits or preferences of a driver of vehicle 12, which may be useful for selecting advertisements specifically targeted to the driver. To determine habits or preferences of the driver, the habit/preferences determination unit 86 may process data from external sensor 30 and/or external sensor 32, data from one or more of subsystems 40, 42, 44, 46 and 48, and/or data received by vehicle 12 from external sources (e.g., using V2X technology). For example, habit/preferences determination unit 86 may process location data from GPS subsystem 48, sensor data from external sensor 30 and/or 32, and/or external source information in order to learn specific locations, or types of locations, frequently visited by the driver of vehicle 12 (e.g., stores, restaurants, etc.), and/or routes (e.g., to or from work) frequently taken by the driver. As another example, habit/preferences determination unit 86 may process any other data from vehicle 12, such as braking information from braking subsystem 40, velocity information speed subsystem 42, steering information from steering subsystem 44, automated versus human driving information from any of subsystems 40, 42, 44 and/or 46, and/or information obtained by vehicle 12 from external sources in order to determine other habits or preferences of the driver (e.g., habitual or preferred speeds relative to posted speed limits, tendency to drive in areas with dense concentrations of pedestrians and/or cyclists, or any other driving preferences or habits such as heavy use of the brake pedal, etc.).

Once habit/preferences determination unit 86 determines a driver habit or preference, habit/preferences determination unit 86 may send data representing the habit or preference to another unit or entity, such as a computer system at a vendor or advertising agency, where an advertisement specifically targeted to the driver of vehicle 12 may be selected for delivery to the driver. For example, the advertisement may be played over internet radio, or emailed to the driver for viewing at a later time. As one specific example, an advertisement for "Restaurant A" may be selected based on data (e.g., data generated by GPS subsystem 48) suggesting that vehicle 12 has often parked at locations known to correspond to restaurants of the same type as Restaurant A. Other examples are discussed below in connection with FIG. 11. In an alternative embodiment, the insurer's computer system 16 itself includes an advertisement selection unit (not shown in FIG. 1) that selects an advertisement targeted to the driver of vehicle 12 based on the determined habit or preference (e.g., for selecting an advertisement for an insurance product or service). For example, an advertisement for a particular insurance service or product may be selected based on data (e.g., data generated by external sensors 30, 32, data generated by subsystems 40, 42, 44, and/or 46, and/or data received by vehicle 12 from external sources using V2X technology) suggesting that the driver of vehicle 12 is a particularly safe, or particularly unsafe, driver.

In some embodiments, data analysis unit 74 not only accesses correlation data 90 (e.g., for purposes of risk determination unit 80 and/or vehicle identification unit 84), but also stores information in correlation data 90. For example, data analysis unit 74 (or interface 62) may send data received from onboard system 14 to correlation data 90 in order to further develop existing correlation models and increase the accuracy of predictive modeling.

The functionality of various portions/units of system 10 are now described in more detail. In particular, FIGS. 2-6 relate to the generation of a virtual model of an accident or other event using external sensor and/or operational data of a vehicle, FIG. 7 relates to identifying characteristics of a first vehicle using external sensor data of a second vehicle, FIGS. 8-10 relate to the determination of risk based on external sensor and/or operational data of a vehicle, and FIG. 11 relates to the determination of driver habits or preferences and advertisement selection based on external sensor data and/or operational data of a vehicle.

Figure 2:
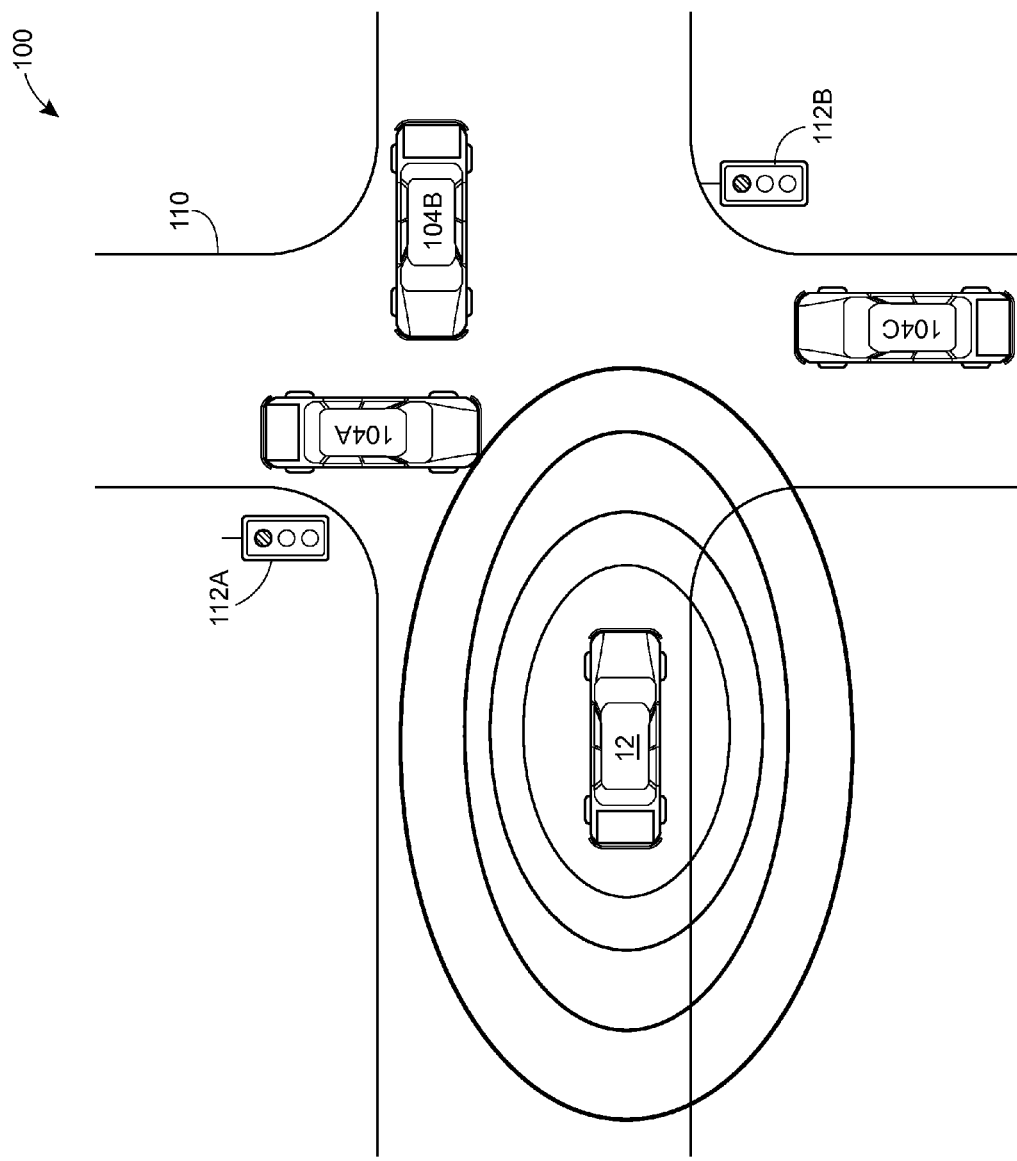
FIG. 2 is a diagram illustrating an example scenario in which an external vehicle sensor is used to collect information to be processed by the system of FIG. 1.

FIG. 2 is a diagram illustrating an example scenario 100 in which an external vehicle sensor is used to collect information to be processed by the system 10 of FIG. 1. In the example scenario 100, vehicle 12 (i.e., vehicle 12 of FIG. 1) carries at least one external sensor (in this example, external sensors 30 and 32 of FIG. 1), in order to sense the external environment of vehicle 12 in substantially a 360 degree range. As discussed above with reference to FIG. 1, the sensors may be a camera, lidar, or other type of sensor, and in other embodiments may include only a single sensor or more than two sensors. Also in the example scenario 100, vehicle 12 is traveling in the vicinity of three other vehicles 104A-104C, at a street intersection 110 with two traffic lights 112A, 112B. In the example scenario 100, the positions and orientations of each of vehicles 104A-104C, the configuration of the street intersection 110, and the positions and state (i.e., light color) of each of the traffic lights 112A, 112B is within the sensing range/capabilities of the external sensor(s) of vehicle 12.

The example scenario 100 represents a snapshot in time shortly before an accident, such as vehicle 104B impacting vehicle 104A, and/or vehicle 104B impacting vehicles 12 and 104C. The onboard system 14 of vehicle 12 may store data from external sensors 30 and/or 32 (and, in some embodiments, operational data from one or more of subsystems 40, 42, 44 and/or 46, and/or V2X or other data provided by sources external to vehicle 12) for a particular amount of time leading up to and/or during the accident, which may be sent to the insurer's computer system 16 of FIG. 1. At the insurer's computer system 16, model generation unit 82 may then process the data to generate a virtual model that re-creates the accident of scenario 100.

Figure 3:
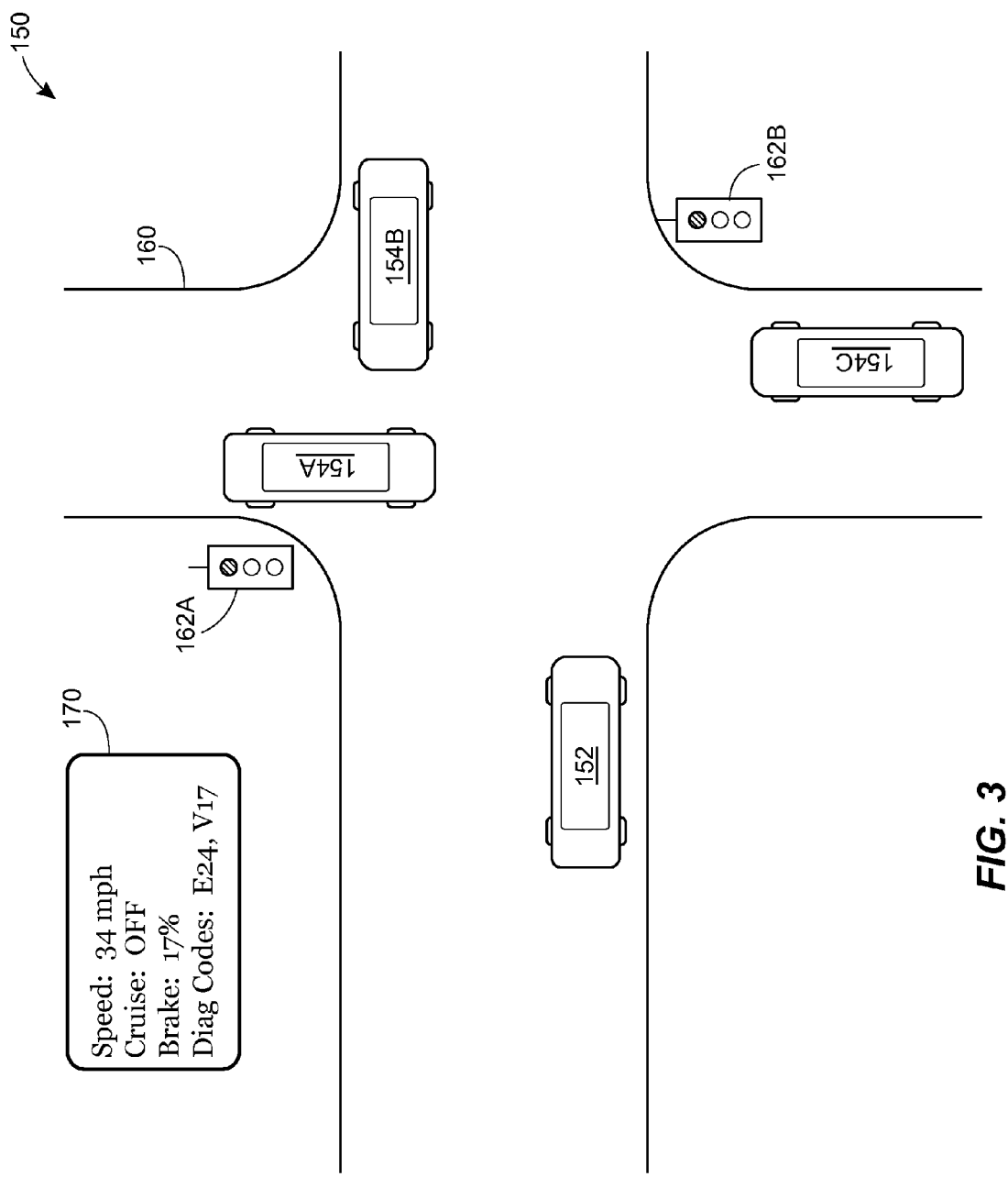
FIG. 3 is a diagram of an example virtual model, generated by the system of FIG. 1 in order to re-create the scenario of FIG. 2.

FIG. 3 is a diagram of an example virtual model 150, generated by the system 10 of FIG. 1 in order to re-create the scenario 100 of FIG. 2, and corresponds to an embodiment in which the virtual model 150 provides an animated re-creation of the accident. In the virtual model 150, vehicle model 152 represents the real-life vehicle 12, vehicle models 154A-154C represent the real-life vehicles 104A-104C, respectively, street intersection model 160 represents the real-life street intersection 110, and traffic light models 162A and 162B represent the real-life traffic lights 112A and 112B, respectively. The virtual model 150 may be generated based solely on external sensor data from one or both of external sensors 30, 32 of vehicle 12, or may be generated using operational data from one or more of subsystems 40, 42, 44 and 46 (or other subsystems) in vehicle 12, and/or data reflecting information received by vehicle 12 from external sources (e.g., using V2X technology), in addition to the external sensor data. For example, to determine the location and/or orientation of vehicle 104B at times when vehicle 154B was not in the line of sight of any external sensors on vehicle 12 (e.g., due to vehicle 104A blocking vehicle 104B), the position and/or orientation of vehicle model 154B within the virtual model 150 may be determined based on data that vehicle 12 received from vehicle 104B (e.g., using V2V technology). Moreover, in some embodiments and scenarios, different temporal segments of the virtual model 150 may be generated using different types of data. For example, a first segment of the virtual model 150 may re-create a first time period leading up to a crash involving vehicle 12, and may be constructed solely or primarily using data from external sensors 30, 32, while a second segment of the virtual model 150 may represent a second time period during the crash (e.g., a period of time that starts at or shortly after impact), and may be constructed using data from one or more subsystems of vehicle 12 that indicates G-forces on vehicle 12 relative to all six degrees of freedom.

In the embodiment of FIG. 3, the virtual model 150 also includes indicators 170 of various operational parameters displayed in conjunction with the animated re-creation of the accident, including indicators of speed of vehicle 12, whether a conventional cruise control system is activated for vehicle 12, a percentage of maximum braking pressure or force applied in vehicle 12, and various diagnostic codes associated with vehicle 12. As just one example, the code "E24" may indicate that engine temperatures are higher than normal for vehicle 12, and the code "V17" may indicate that a rear, left-side taillight is disabled for vehicle 12. In other embodiments, the indicators 170 include additional operational parameters not shown in FIG. 3 (e.g., an indicator of whether a fully automated driving system is activated for vehicle 12, etc.), omit some of the operational parameters that are shown in FIG. 3, and/or are displayed in a different manner than shown in FIG. 3 (e.g., on a different display window entirely, or superimposed on vehicle model 152, etc.). The indicators 170 are generally time-aligned with the animation provided by virtual model 150, so that a person viewing the animated re-creation can determine how the various operational parameters relate, in time, to the changing positions of the vehicles 12 and 104A-104C, and to the changing states of the traffic lights 112A, 112B, etc.

In some embodiments, the virtual model 150 also either graphically depicts weather/visibility conditions (e.g., rain, fog, snow, night versus day, etc.), or includes text describing the weather/visibility conditions within indicator 170. Additionally, or alternatively, the virtual model 150 may either graphically depict street conditions (e.g., wet, icy, bumpy, etc.), or include text describing the street conditions within indicator 170. The weather/visibility and/or street conditions (and/or any other environmental conditions) may be determined by model generation unit 82 based on data from external sensor 30 and/or external sensor 32, and/or based on data received vehicle 12 receives from external sources (e.g., via V2X communications), for example.

While the virtual model 150 provides a "bird's eye" perspective of an accident, in other embodiments the virtual model 150 provides a different perspective. In one embodiment where the external sensor 30 of FIG. 1 is a video camera device, for example, the virtual model 150 provides raw frames as captured by the video camera device, and the indicators 170 overlay the sequence of video frames, or are displayed next to the sequence of video frames. Moreover, in some embodiments, the virtual model 150 allows an individual (e.g., at the insurer's computer system 16 of FIG. 1) to selectively change the perspective in order to gain a more complete understanding of the accident.

By viewing a display (or multiple displays with different perspectives) of the virtual model 150, an individual may be able to make important determinations regarding the facts of the actual scenario 100. For example, the viewer may be able to determine that the driver of vehicle 104A was entirely at fault for the accident because, according to virtual model 150, the driver of vehicle 104A attempted to pass through intersection 110 while the traffic light 112A was red. Alternatively, if the vehicle 12 is also involved in the accident of scenario 100, the viewer may be able to determine that the driver of vehicle 12 was also partially at fault for the accident based on the speed of vehicle 12 as shown by indicators 170. The viewer may also be able to make other assessments, such as roughly estimating an amount of damage to vehicle 12 (and/or other vehicles) due to the accident (e.g., based on speed and angle of impact). In some scenarios and embodiments, the external sensor(s) 30, 32 of vehicle 12 may directly capture images portraying body damage to one or more vehicles, thereby further facilitating the initial damage assessment.

Figure 4:
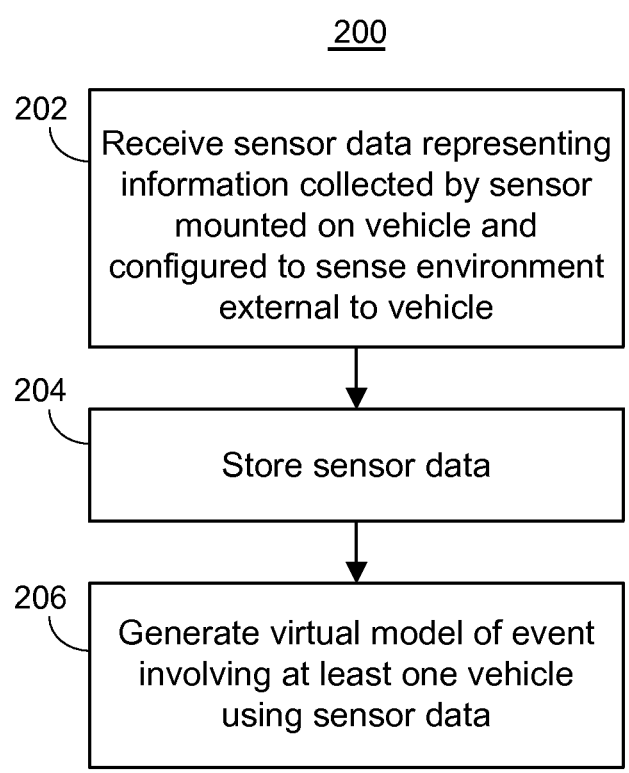
FIG. 4 is a flow diagram of an example method of utilizing external vehicle sensor data to generate a virtual model of an event involving at least one vehicle.

FIG. 4 is a flow diagram of an example method 200 of utilizing external vehicle sensor data to generate a virtual model of an event involving at least one vehicle. In an embodiment, the method 200 is implemented in whole or in part by the insurer's computer system 16 of FIG. 1. Alternatively, or additionally, in an embodiment, the method 200 is implemented at least in part by the onboard system 14 of FIG. 1.

The method 200 receives sensor data representing information collected by a sensor located on or inside a vehicle and configured to sense an environment external to the vehicle (block 202). The sensor may be a camera device, lidar device, radar device, or sonar device, for example. The sensor may be permanently or removably affixed to an exterior or interior (e.g., passenger cabin) portion of the vehicle, or simply placed on or in a portion of the vehicle (e.g., on a dashboard). In some embodiments, the sensor is included in a general purpose computing device, such as a smartphone having sensor hardware and running a sensor application. In other embodiments, the sensor includes only dedicated hardware and/or software. The sensor data may be data that was directly generated by the sensor, or data that was converted from other information (e.g., other data or analog signals) generated by the sensor, for example.

In some embodiments, the sensor data is received at a server remote from the vehicle via a wireless communication network, such as a wireless communication network of network 20 in FIG. 1. In other embodiments, the sensor data is received at a server remote from the vehicle via a portable memory device, such as a portable hard drive or flash device. For example, a portable memory device may be plugged into a hardware interface at the vehicle, used to download sensor data from the vehicle, and physically carried to a remote server (e.g., in insurer's computer system 16) so that the sensor data may be received by the server. In another example embodiment, the sensor data is transferred to a field agent's computing device (e.g., laptop or smartphone) via a short-range wireless link (e.g., Bluetooth link), USB or other cable connection, or portable memory device (e.g., flash drive), and then transmitted to the remote server in a wired or wireless manner.

The method 200 also stores the sensor data received at block 202 to a memory (block 204). The memory may be similar to memory 72 of FIG. 1, for example. The method 200 then retrieves the sensor data from the memory, and uses the sensor data to generate a virtual model of an event involving at least one vehicle (block 206). The event may be an accident involving the vehicle on or in which the sensor is located, for example, and/or involving one or more other vehicles. Alternatively, the event may be another type of incident, other than an accident, involving a vehicle. In each instance, however, the event is one that, when occurring, is at least partially sensed by the sensor located on or in the vehicle.

In some embodiments, the virtual model includes an animated re-creation of the event. The animated re-creation may depict various factors or circumstances relating to the event, such as an orientation of the vehicle with respect to a second vehicle or other object, a closing speed between the vehicle and a second vehicle or other object, a configuration of and/or condition of a driving surface (e.g., the street(s) on which the event occurs), visibility conditions external to the vehicle (e.g., weather conditions, darkness, etc.), a traffic control indicator external to the vehicle (e.g., a traffic light, speed limit sign, stop sign, etc.), a state of a traffic control indicator external to the vehicle (e.g., whether a traffic light is red, yellow or green), etc. When displayed, the animated re-creation may look similar to the example virtual model 150 of FIG. 3 (with or without indicators 170), for example.

In alternative embodiments, the method 200 also includes additional blocks not shown in FIG. 4. For example, in an embodiment where the event re-created by the virtual model is an accident involving the vehicle and/or other vehicles, the method 200 also causes the virtual model to be displayed (e.g., to a user of an electronic processing system implementing the method 200), causes data representing the virtual model to be sent to an electronic claims processing system, and/or determines, based on the virtual model, fault for the accident and/or damages resulting from the accident. Fault and/or damages may be determined by a user viewing a display of the virtual model, or automatically determined based on various processing algorithms, for example.

As another example, in some embodiments, the virtual model is generated using data from external sensors of at least two different vehicles (e.g., in order to re-create an accident or other event involving both vehicles). For example, the method 200 may also receive additional sensor data that represents information collected by a different, second sensor, where the second sensor is located on or in a different, second vehicle and configured to sense an environment external to the second vehicle. The second sensor may be of the same type as the sensor of the first vehicle, or of a different type, and may be received in the same or a similar manner. For example, the sensor data of the second vehicle may be received, at a server, directly from the second vehicle (e.g., via a wireless network and/or portable memory device), or may be received from the first vehicle (e.g., if the first vehicle first obtains the data from the second vehicle via V2V communications). In these embodiments, the method 200 also stores the additional sensor data in the memory, and the method 200 generates the virtual model at block 204 not only based on the sensor data corresponding to the first sensor, but also based on the additional sensor data corresponding to the second sensor.

As another example, in some embodiments, the virtual model is generated using not only external sensor data of a vehicle, but also operational data of the vehicle. For example, the method 200 may also receive operational data indicative of operation of the vehicle on or in which the sensor is located, and store the operational data in the memory. The operational data may be indicative of velocity of the vehicle, acceleration of the vehicle, braking of the vehicle, status of an automated driving system of the vehicle (e.g., whether an automated driving system such as a conventional cruise control system, or a completely automated/machine driving system, is activated), and/or diagnostics information associated with the vehicle (e.g., whether a software or hardware subsystem within the vehicle has failed or is otherwise operating incorrectly), for example. In some embodiments, the operational data is indicative of movement of the vehicle relative to any or all of the six degrees of freedom (e.g., by specifying G-forces with respect to each degree of freedom). The operational data may be data that was directly generated by one or more subsystems of the vehicle, data that was converted from other information (e.g., other data or analog signals) that was generated by one or more subsystems of the vehicle, and/or data that was generated in response to the direct detection of one or more manual or machine inputs that control operation of the vehicle, for example. In this embodiment, the method 200 generates the virtual model (block 204) not only based on the sensor data, but also based on the operational data. The accuracy and/or detail of the virtual model may be improved as a result of the operational data, and/or the virtual model may provide indicators of operational parameters (e.g., speed, error codes, etc., as determined based on the operational data) in conjunction with an animated re-creation of the event or in conjunction with captured frames showing the event.

As yet another example, in some embodiments, the virtual model is generated using not only external sensor data of a vehicle, but also data representing information that was received by the vehicle from one or more external sources via one or more wireless signals (e.g., V2V, V2I and/or V2P signals). For example, the method 200 may also receive data representing information that was included in wireless signals received by the vehicle, and store the data in the memory. The data may be indicative of any object and/or environmental condition in the vicinity of the vehicle, such as weather conditions, street configurations, vehicle cyclist or pedestrian locations, or traffic control indicators or status, for example. The data may be data that was included in the wireless (e.g., V2X) signals, or data that was converted from data included in the wireless signals, for example. In these embodiments, the method 200 generates the virtual model (block 204) not only based on the sensor data, but also based on the data representing information that the vehicle had received from the external source(s). The accuracy and/or detail of the virtual model may be improved using the information provided by the external source(s), and/or the virtual model may provide indicators of the information provided by the external source(s) in conjunction with an animated re-creation of the event, or in conjunction with captured frames showing the event.

Figure 5:
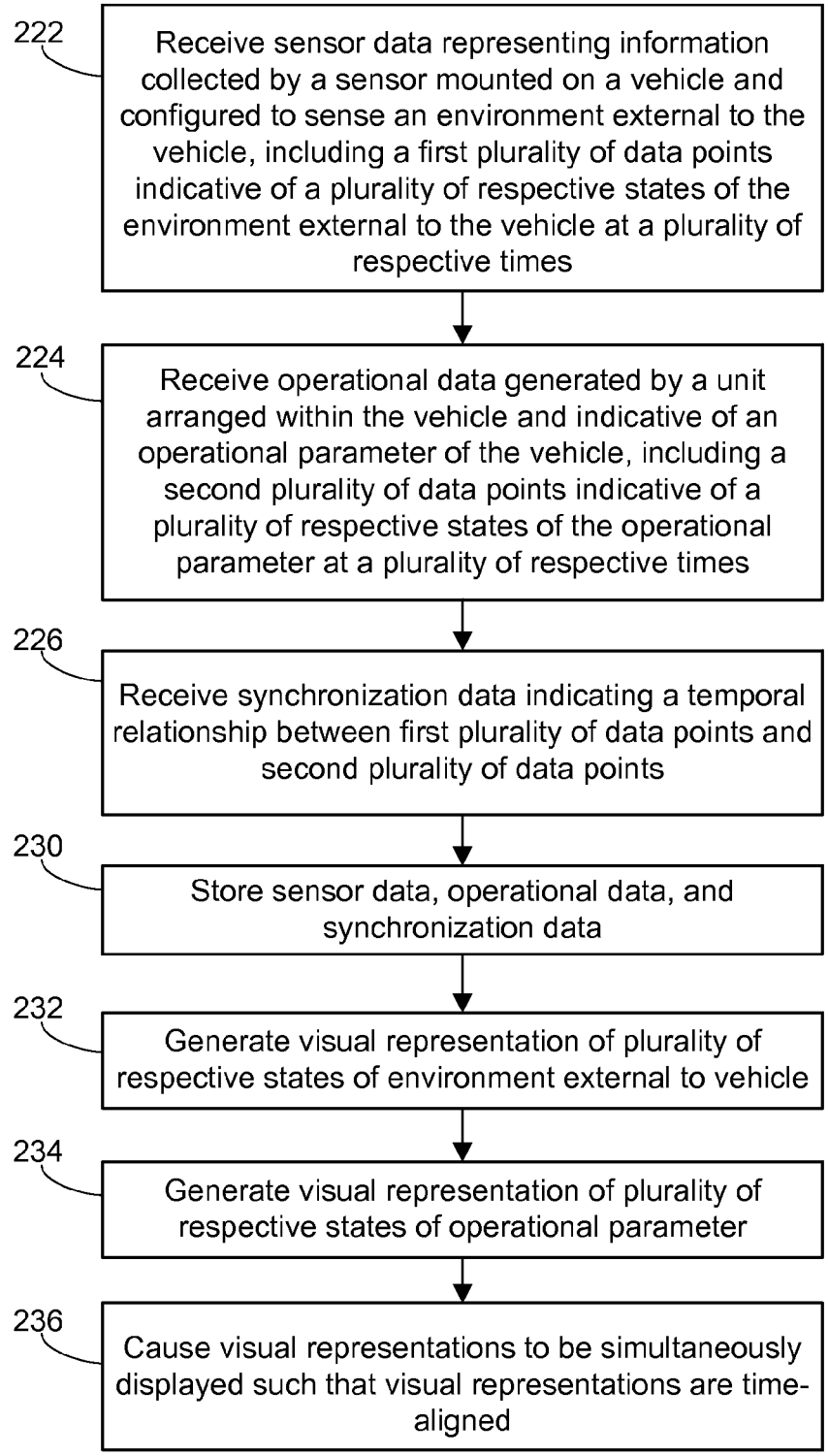
FIG. 5 is a flow diagram of an example method of utilizing external vehicle sensor data, operational data, and synchronization data to generate a synchronized virtual model of an event involving the vehicle.
Figure 6:
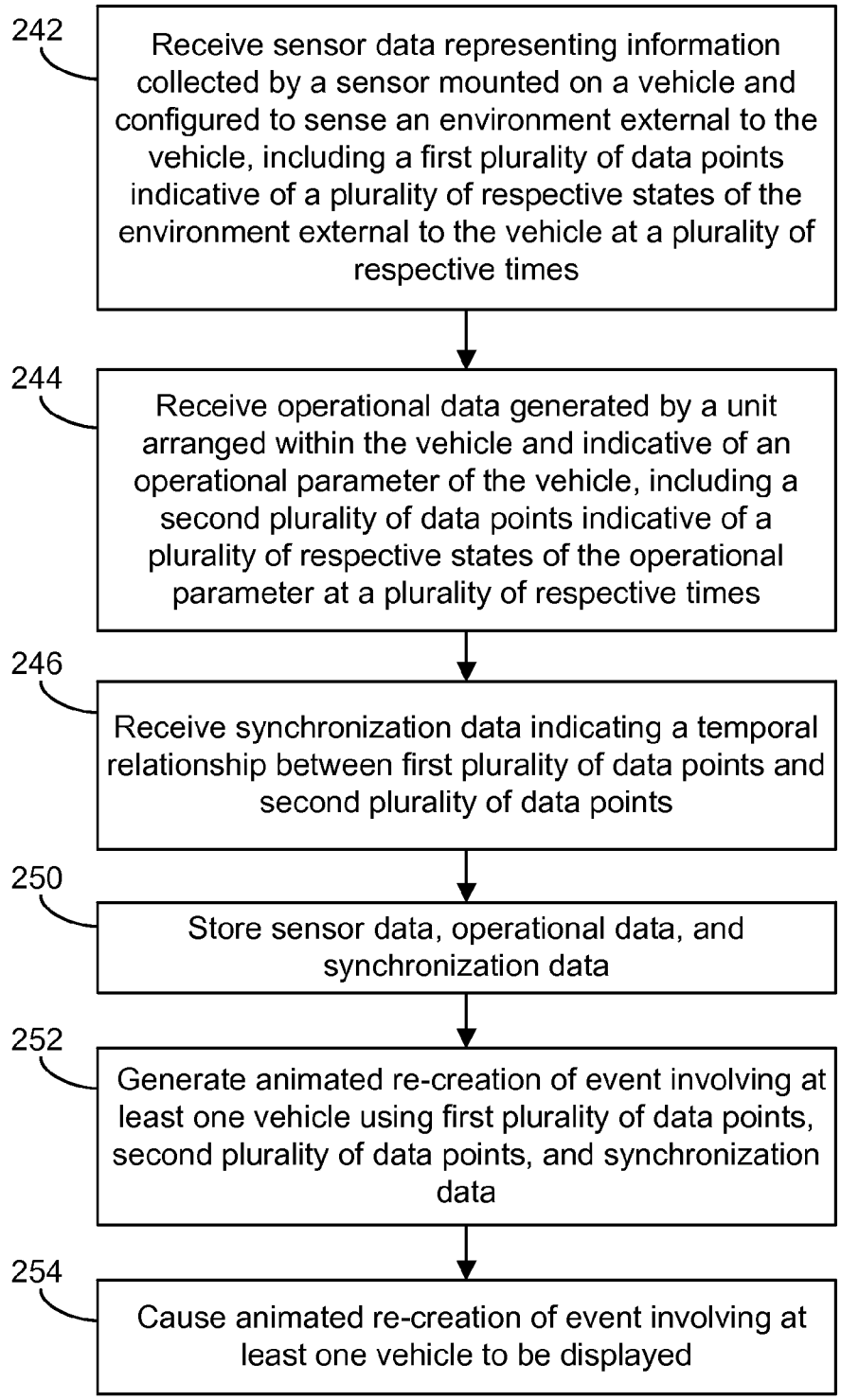
FIG. 6 is a flow diagram of another example method of utilizing external vehicle sensor data, operational data, and synchronization data to generate a synchronized virtual model of an event involving a vehicle.

Preferably, in embodiments where a virtual model of an event is generated using both external sensor data and operational data, the sensor data and operational data is synchronized such that the virtual model provides an accurate temporal representation of the event. FIGS. 5 and 6 show example methods of utilizing external vehicle sensor data, operational data, and synchronization data to generate a synchronized virtual model of an event involving a vehicle. Specifically, FIG. 5 relates to an embodiment in which sensor data and operational data are each used to generate respective visual representations that are displayed simultaneously to provide visualization of an event involving a vehicle, and FIG. 6 relates to an embodiment in which sensor data and operational data are jointly used to generate an animated re-creation to provide visualization of an event involving a vehicle.

Referring first to FIG. 5, a method 220 is implemented in whole or in part by the insurer's computer system 16 of FIG. 1. Alternatively, or additionally, in an embodiment, the method 220 is implemented at least in part by the onboard system 14 of FIG. 1. The method 220 receives sensor data representing information collected by a sensor configured to sense an environment external to a vehicle (block 222). The sensor is located on or in the vehicle, and may be a device similar to that discussed above in connection with block 202 of method 200 (e.g., a camera device, a lidar device, etc.), for example. The received sensor data includes a first plurality of data points indicative of a plurality of respective states of the environment external to the vehicle at a plurality of respective times. For example, each data point may correspond to a different frame captured by a video camera or lidar device. The sensor data may be received in a manner similar to that described above in connection with block 202 of method 200 (e.g., at a server remote from the vehicle, etc.), for example.

The method 220 also receives operational data generated by a unit that is arranged within the vehicle and indicative of an operational parameter of the vehicle (block 224). The unit may be hardware and/or software that is configured to monitor and/or control the operational parameter. The operational data may be indicative of velocity of the vehicle, acceleration of the vehicle, braking of the vehicle, status of an automated driving system of the vehicle (e.g., whether an automated driving system such as a cruise control mode, or a completely automated/machine driving mode, is activated), and/or diagnostics information associated with the vehicle (e.g., whether a software or hardware system within the vehicle has failed or is otherwise operating incorrectly), for example. In some embodiments, the operational data is indicative of movement of the vehicle relative to any of the six degrees of freedom (e.g., by indicating G-forces with respect to each degree of freedom). The received operational data includes a second plurality of data points indicative of a plurality of respective states of the operational parameter at a plurality of respective times. For example, each data point may correspond to a state/value of the operational parameter at the respective time (e.g., the speed at the respective time, the degree a steering wheel is turned in a particular direction at the respective time, the degree of pressure on a brake pedal at the respective time, etc.). The operational data may be received in a manner similar to that described above (for sensor data) in connection with block 202 of method 200 (e.g., at a server remote from the vehicle, etc.), for example.

The method 220 also receives synchronization data indicating a temporal relationship between first plurality of data points received at block 222 and the second plurality of data points received at block 224 (block 226). The synchronization data may be received in a manner similar to that described above (for sensor data) in connection with block 202 of method 200 (e.g., at a server remote from the vehicle, etc.), for example. In one embodiment, the synchronization data includes data indicating which of the first plurality of data points (in the sensor data) corresponds to which of the second plurality of data points (in the operational data). For example, a data collection unit at the vehicle may sample data points of sensor data and data points of operational data at the same times, and store each pair of data points in a relational database that links each pair of data points together to indicate that those data points correspond to a same time. With reference to FIG. 1, for example, data collection unit 50 may, at the same time, sample a data point of sensor data from external sensor 30 or 32, and a data point of operational data from one of subsystems 40, 42, 44 or 46, and store the pair of sampled data points in a relational database in memory 52.

In another embodiment, the synchronization data includes a first plurality of time stamps that each correspond to a respective one of the first plurality of data points, and a second plurality of time stamps that each correspond to a respective one of the second plurality of data points. For example, each sensor that generates sensor data at the vehicle, and each subsystem that generates operational data at the vehicle, may generate and provide time stamps that indicate which sets of data (i.e., which data points) correspond to which times. Referring again to FIG. 1, for example, external sensors 30, 32 and one or more of subsystems 40, 42, 44 and 46 may generate time stamps for each data point generated by the sensor or subsystem, provide those time stamps to data collection unit 50 for storage (along with the data points themselves) in memory 52.

The method 220 also stores the sensor data received at block 222, the operational data received at block 224, and the synchronization data received at block 226 in a memory (block 230). The sensor data, operational data, and synchronization data may be stored in memory 72 of FIG. 1, for example.

The method 220 retrieves the stored sensor data, operational data, and synchronization data from memory, and uses the retrieved data to generate a virtual model of an event involving the vehicle (blocks 232, 234 and 236). More specifically, the method 220 uses the first plurality of data points to generate a visual representation of the plurality of respective states of the environment external to the vehicle (block 232), uses the second plurality of data points to generate a visual representation of the plurality of respective states of the operational parameter (block 234), and uses the synchronization data to cause the visual representations generated at blocks 232 and 234 to be simultaneously displayed such that the two visual representations are time-aligned (block 236).

The visual representation of the plurality of respective states of the environment external to the vehicle (block 232) generally provides a visualization of the event (e.g., accident) being re-created. In one straightforward example where the sensor data is data from a video camera, lidar, or other sensor device located on or in the vehicle, the visual representation of the states of the external environment may simply be the captured frames (e.g., video frames), with each frame being generated using a single data point of the first plurality of data points. In another example embodiment, the visual representation is instead an animated re-creation having a perspective that need not align with the perspective of the sensor that captured the data (e.g., a perspective from above the event, the perspective of a driver of the vehicle on or in which the sensor is located, etc.).

The visual representation of the plurality of respective states of the operational parameter (block 234) generally provides a visual indication (e.g., a number, word, alphanumeric code, bar graph, etc.) of the status of the operational parameter at the times corresponding to each of the second plurality of data points. In one embodiment where the operational data was provided by a subsystem that controls or monitors speed of the vehicle (e.g., speed subsystem 42 of FIG. 1), for example, the visual representation of the states of the operational parameter may be a number, a needle position on a virtual speedometer, or another indicator, with each value/position of the visual indicator being generated using a single data point of the second plurality of data points.

Using the synchronization data to cause the visual representations generated at blocks 232 and 234 to be simultaneously displayed such that the two visual representations are time-aligned involves different techniques in different embodiments. In one embodiment where the synchronization data includes time stamps for each of the first plurality of data points and for each of the second plurality of data points, for example, the method 220 reads the time stamp values to align the corresponding frames of the visual representation generated at block 232 with the operational parameter states/values of the visual representation generated at block 234. In embodiments and scenarios where the time stamp values of the first plurality of data points do not exactly match the time stamp values of the second plurality of data points, any suitable algorithm or rule may be used to determine a "best match" between data points, such as associating those data points that are closest in time.

In another embodiment, where the synchronization data includes data (e.g., data associated with a relational database) that links pairs of data points that were sampled at substantially the same time, the method 220 uses the linkage data to determine which frames of the visual representation generated at block 232 are to be displayed with which of the operational parameter states/values of the visual representation generated at block 234.

The visual representations may be displayed to a user of an electronic processing system implementing the method 220 (e.g., the insurer's computer system 16 of FIG. 1) on a monitor or smartphone touchscreen, for example. The method 220 may cause the visual representations to be displayed in any of various different ways. In one embodiment, for example, the method 220 causes the visual representations to be displayed by sending video data to a video processing card (or other video processing unit) coupled to a monitor or screen. In another embodiment, the method 220 causes the visual representations to be displayed by sending a command to another unit or processing system, either automatically or in response to a user input.

One example of the simultaneous display of the first and second visual representations is provided above with reference to FIGS. 2 and 3. In the example of FIG. 3, the first visual representation of method 220 is an animated re-creation that includes the representation of the vehicles 152 and 154A-154C, the intersection 160, and the traffic lights 162A, 162B, while the second visual representation of method 220 includes the representation of the speed ("34 mph") in the indicators 170. Synchronized displays of this sort may allow a viewer to visualize an event such as an accident, while also viewing precise metrics (e.g., vehicle speed, vehicle warning codes, etc.) that provide a more complete understanding of how the event occurred (e.g., who was at fault) and/or the likely outcome of the event (e.g., an amount of damage or injury).

In some embodiments, the blocks of method 220 are performed in an order different than that shown in FIG. 5. For example, blocks 222, 224 and/or 226 may occur in a different order, or may occur at least in part simultaneously. As another example, blocks 232 and 234 may be performed at least in part simultaneously with block 236 (e.g., as parts of a single software operation as executed by a processor). Further, in some embodiments, the method 220 includes additional blocks. In one embodiment where the visualized event is an accident, for example, the method 220 also determines fault for the accident based on the virtual model, and/or determines damages resulting from the accident based on the virtual model (e.g., as determined by a user viewing a display of the virtual model, or as determined automatically based on various processing algorithms).

As another example, in an alternative embodiment, the method 220 also receives, and stores in the memory, additional operational data that is generated by another unit arranged within the same vehicle, where the additional operational data is indicative of a different operational parameter of the vehicle. The additional operational data may include a third plurality of data points indicative of a plurality of respective states of the additional operational parameter at a plurality of respective times, for example. In this embodiment, the synchronization data received at block 226 may indicate a temporal relationship between the first, second and third plurality of data points, and the method 220 may further generate a third visual representation that is a representation of the plurality of respective states of the additional operational parameter (e.g., a visual indication of braking pressure, a visual indication that a conventional cruise control system is active or not active, a visual indication that a fully automated/machine driving system is active or not active, etc.). The synchronization data may then be used to cause the first, second and third visual representations to be simultaneously displayed such that all three visual representations are time-aligned. In FIG. 3, for example, the first visual representation includes the representation of the vehicles 152 and 154A-154C, the intersection 160, and the traffic lights 162A, 162B, the second visual representation includes the representation of the speed ("34 mph") in the indicators 170, and the third visual representation includes the representation of whether the cruise control system is activated ("OFF") in the indicators 170.

Referring next to FIG. 6, an example method 240 is implemented in whole or in part by the insurer's computer system 16 of FIG. 1. Alternatively, or additionally, in an embodiment, the method 240 is implemented at least in part by the onboard system 14 of FIG. 1.

Like method 220 of FIG. 5, the method 240 receives sensor data representing information collected by a sensor located on or in a vehicle and configured to sense an environment external to the vehicle (block 242), operational data generated by a unit that is arranged within the vehicle and indicative of an operational parameter of the vehicle (block 244), and synchronization data indicating a temporal relationship between the first plurality of data points received at block 242 and the second plurality of data points received at block 244 (block 246), and stores the sensor data, operational data and synchronization data in a memory (block 250). Blocks 242, 244, 246 and 250 are the same as blocks 202, 204, 206 and 210, respectively, of method 220, in an embodiment.

The method 240 retrieves the first plurality of data points, the second plurality of data points, and the synchronization data from memory, and uses that data to generate an animated re-creation of an event involving at least one vehicle (block 252). The event may be an accident, for example, and may involve the vehicle on or in which the sensor is located, and/or one or more other vehicles. Whereas the method 220 of FIG. 5 relates to an embodiment where sensor data and operational data are used to generate visually distinct representations (e.g., captured frames or an animated re-creation as generated from the sensor data, versus an indicator of an operational parameter as generated from the operational data), the method 240 jointly uses the first plurality of data points, the second plurality of data points, and the synchronization data to generate an animated re-creation. In one embodiment, for example, data representing an operational parameter such as vehicle speed or steering is used to fill gaps in the information provided by the sensor data. In one scenario where an external sensor experiences an outage (e.g., is temporarily blocked or disabled), for example, speed, braking and/or steering data may be used to estimate where the vehicle is in relation to other vehicles or objects during the outage. In another embodiment, data representing an operational parameter is instead (or additionally) used to confirm features of the animated re-creation that are initially determined based on the sensor data. In one scenario where an external sensor provides sensor data that indicates a particular closing speed between the vehicle and another vehicle with less than 100% certainty, for example, speed data may be used to confirm the initial estimate of the closing speed, or to refine the initial estimate of the closing speed.

As with the method 220, the synchronization data (e.g., time stamps, or data pertaining to a relational database, etc.) is used to ensure that the first plurality of data points (sensor data) and second plurality of data points (operational data) are time-aligned. In this manner, misalignment issues in the animated re-creation, such as instances where the sensor data suggests a sequence of vehicle positions that conflicts with the sequence of vehicle positions suggested by one or more operational parameters, may be avoided.

The method 240 also causes the animated re-creation of the event to be displayed (block 254). The animated re-creation may be displayed to a user of an electronic processing system implementing the method 240 (e.g., the insurer's computer system 16 of FIG. 1) on a monitor or smartphone touchscreen, for example. The method 240 may cause the animated re-creation to be displayed in any of various different ways. In one embodiment, for example, the method 240 causes the animated re-creation to be displayed by sending video data to a video processing card (or other video processing unit) coupled to a monitor or screen. In another embodiment, the method 240 causes the animated re-creation to be displayed by sending a command to another unit or processing system, either automatically or in response to a user input.

In some embodiments, the blocks of method 240 are performed in an order different than that shown in FIG. 6. For example, blocks 242, 244 and/or 246 may occur in a different order, or may occur at least in part simultaneously. Further, in some embodiments, the method 240 includes additional blocks. In one embodiment where the visualized event is an accident, for example, the method 240 also determines fault for the accident based on the animated re-creation, and/or determines damages resulting from the accident based on the animated re-creation (e.g., as determined by a user viewing a display of the animated re-creation, or as determined automatically based on various processing algorithms).

While the methods 220 and 240 of FIGS. 5 and 6, respectively, have been described with respect to synchronization of sensor data and operational data, in other embodiments the sensor data is instead synchronized with (or is also synchronized with) data representing information that the vehicle received from an external source via a wireless link (e.g., using V2V, V2I, V2P or other similar technologies). With respect to method 220, for example, the data representing the external source information may be received at block 224, stored at block 230, and used to generate a visual representation of a plurality of states (e.g., current weather/visibility conditions, current locations, current speed limits, etc.) at block 234, with the visual representations being simultaneously displayed with the other visual representations (corresponding to external sensor data) at block 236 in the manner described above. With respect to method 240, the data representing the external source information may be received at block 244, stored at block 250, and used (with the external sensor data and synchronization data) to generate the animated re-creation of the event at block 252 in the manner described above.

Figure 7:
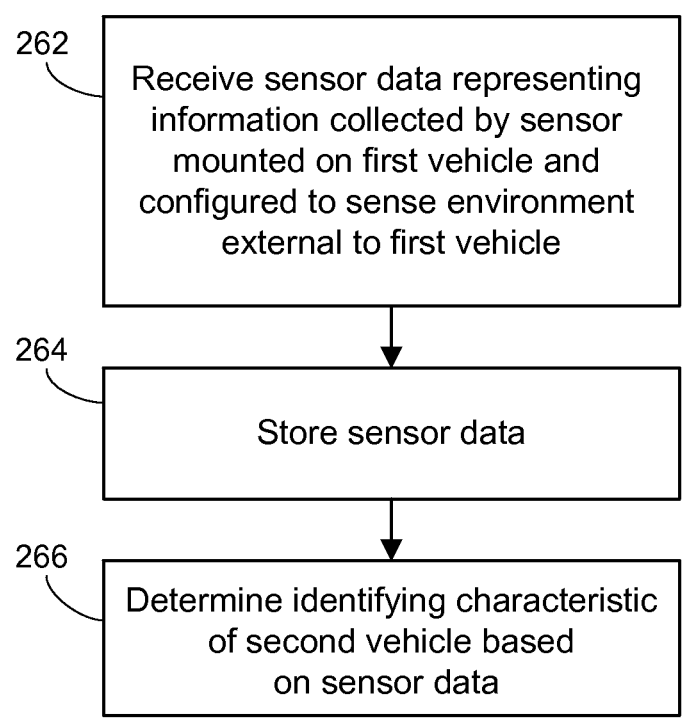
FIG. 7 is a flow diagram of an example method of utilizing external vehicle sensor data to determine identifying characteristics of another vehicle.

As discussed above in connection with FIG. 1, in some embodiments, external sensors of a first vehicle may be used to gather information about a different, second vehicle. In order to be useful to the insurance provider, however, information of that sort may generally include information that serves to identify the second vehicle. Accordingly, FIG. 7 is a flow diagram of an example method 260 of utilizing external vehicle sensor data to determine an identifying characteristic of another vehicle. In an embodiment, the method 260 is implemented in whole or in part by the insurer's computer system 16 of FIG. 1. Alternatively, or additionally, in an embodiment, the method 260 is implemented at least in part by the onboard system 14 of FIG. 1.

The method 260 receives sensor data representing information collected by a sensor located on or in a first vehicle and configured to sense an environment external to the first vehicle (block 262). Block 262 may be similar to block 202 of method 200, for example. The method 260 also stores the sensor data received at block 262 in a memory (block 264). Block 264 may be similar to block 204 of method 200, for example.

The method 260 retrieves the sensor data from memory, and uses the sensor data to determine an identifying characteristic of the second vehicle (block 266). The identifying characteristic is a fixed or semi-fixed physical property of the second vehicle, rather than a transient condition such as current vehicle speed or location. In one embodiment, for example, a license plate number of the second vehicle is determined. Alternatively, or additionally, a make, model, year, and/or color of the second vehicle may be determined, and/or the state in which the second vehicle is registered may be determined. In an embodiment where the sensor located on or in the first vehicle is a camera (e.g., video camera), for example, the method 260 may utilize image processing to determine the identifying characteristic (e.g., by reading the number and/or state from a license plate of the second vehicle, etc.).

In some embodiments, the method 260 includes additional blocks. In one embodiment, for example, the method 260 also accesses a memory to determine, based on the identifying characteristic determined at block 266, whether the second vehicle is an insured vehicle, and/or whether a particular insurer provides insurance for the second vehicle (e.g., to help the insurer target its advertising to those in need of insurance). In another example embodiment, the method 260 generates a virtual model of an accident involving the second vehicle (and possibly the first vehicle and/or one or more other vehicles) using the sensor data stored at block 264. The virtual model may be generated in accordance with any of method 200, 220 and/or 240, for example. The method 260 may then further determine, based on the virtual model, fault for the accident and/or damages resulting from the accident (e.g., as determined by a user viewing a display of the virtual model, or as determined automatically based on various processing algorithms), and/or may cause the virtual model to be displayed (e.g., by sending data representing the virtual model to a video processing card, or sending a command to another unit or computing system, etc.). If the driver of the second vehicle is determined to be at fault for an accident, identifying characteristics of the second vehicle determined at block 266 may be used to help identify the responsible party. In still another embodiment, the method 260 causes data representing the identifying characteristic of the second vehicle to be sent to an electronic claims processing system (e.g., by providing the data to a network interface card, etc.).

Figure 8:
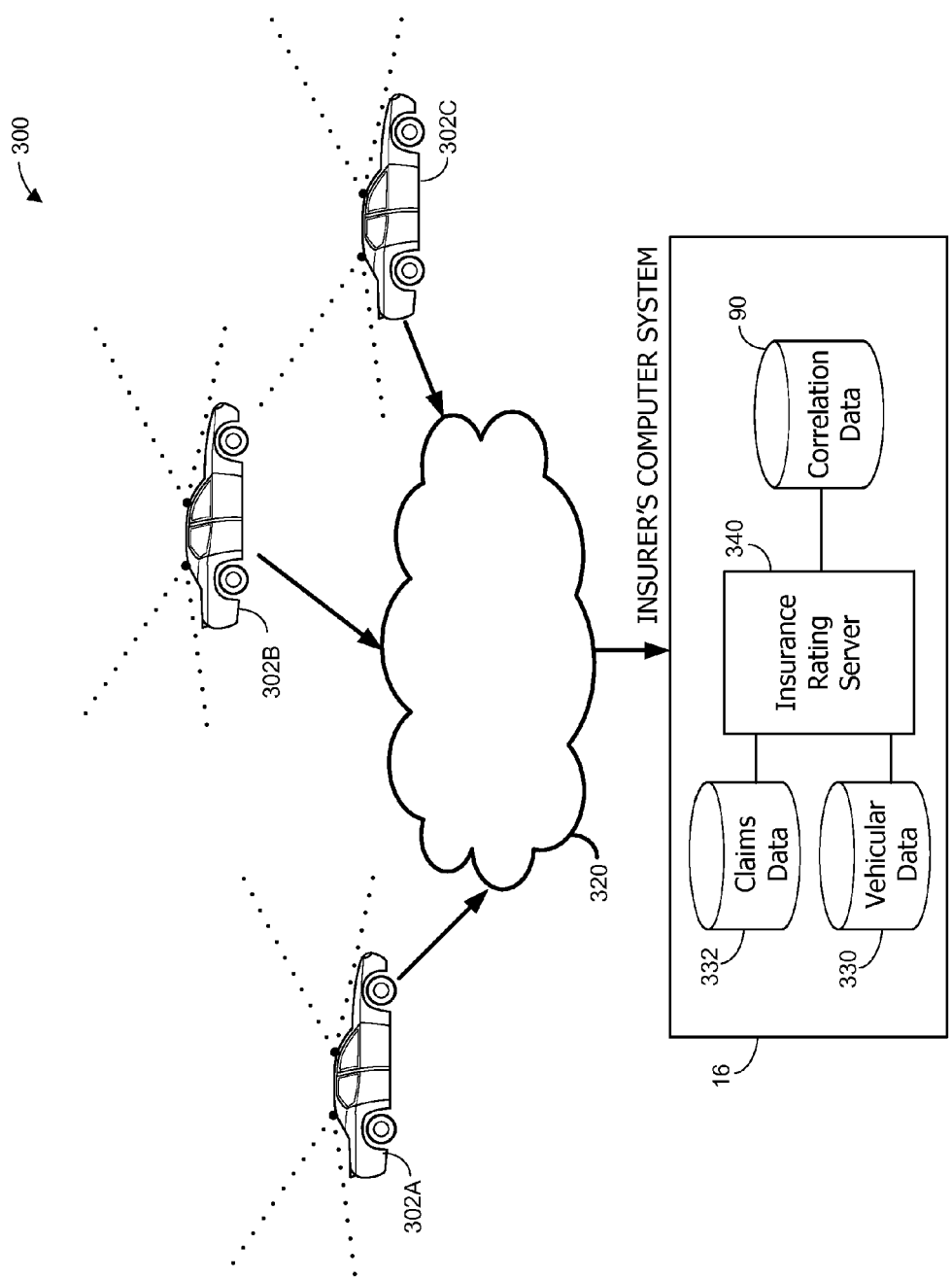
FIG. 8 is a block diagram of an example system for identifying correlations between data obtained from external vehicle sensors and probabilities of incurring losses recognizable under an insurance policy.

As discussed above in connection with FIG. 1, risk level for a driver of a vehicle is determined in some embodiments, which may involve the use of predictive models. The predictive models may utilize correlations between data obtained from external vehicle sensors (in conjunction with operational data from the vehicles, in some embodiments) and probabilities of incurring losses recognizable under an insurance policy. FIG. 8 is a block diagram of an example system 300 for identifying such correlations. FIG. 8 depicts the same correlation data 90 as shown in FIG. 1, as well as portions of the insurer's computer system 16 not shown in FIG. 1.

In the example system 300, each of vehicles 302A-302C is equipped with one or more external sensors and, in some embodiments, with one or more subsystems for controlling and/or monitoring operational parameters of the respective vehicle. Each of vehicles 302A-302C may carry an onboard system similar to onboard system 14 of FIG. 1, for example. While FIG. 8 shows the collection of data from only three vehicles, other scenarios may involve collecting data from a very large number of vehicles (e.g., thousands or millions of vehicles).

Vehicle data from the vehicles 302A-302C (e.g., data from sensors similar to external sensors 30, 32 and/or subsystems 40, 42, 44, 46, 48) is sent to the insurer's computer system 16 via a network 320, which may be similar to (or include) the network 20 of FIG. 1. In some embodiments, the vehicle data also includes data representing information that one or more of the vehicles 302A-302C received from external sources via wireless signals (e.g., using V2X technology). In various embodiments and/or scenarios, the vehicle data from vehicles 302A-302C is uploaded to the insurer's computer system 16 at times corresponding to particular events (e.g., in response to onboard systems of vehicles 302A-302C detecting accidents involving the respective vehicles), on a regular basis (e.g., once per day, month, billing cycle, etc.), on a substantially real-time basis (e.g., as data is collected by sensors and/or subsystems of vehicles 302A-302C), etc. In an alternative embodiment, data from one or more of vehicles 302A-302B is carried to the insurer's computer system 16 via portable memory devices, or via a combination of portable memory devices and wireless networks (e.g., in embodiments where field agents use portable memory devices to download vehicle data to a portable computer that transmits the data to the insurer's computer system 16).

The insurer's computer system 16 stores the vehicle data from vehicles 302A-302C in a memory 330. The insurer's computer system 16 also has access to claims data of policy holders associated with the vehicles 302A-302C, which is stored in a memory 332 and corresponds to at least some of the same time periods as the vehicle data in memory 330. The claims data in memory 332 indicates actual instances of past losses under the various insurance policies of the policy holders, along with associated information such as the date of the loss, the type of loss, amounts paid to the policy holders due to the loss, etc. An insurance rating server 340 in the insurer's computer system 16 may retrieve the claims data from the memory 332 and the collected vehicle data from the memory 330, and utilize the retrieved data to identify particular patterns in the vehicle data that exhibit strong correlations with contemporaneous losses identified in the claims data, and/or particular patterns in the vehicle data that exhibit strong correlations with an absence of losses (or only minor losses, etc.). For example, the insurance rating server 340 may determine that losses are more frequent and/or larger for vehicles that are often driven in rainy or snowy weather (e.g., as detected by external sensor data), or for vehicles that are often driven at high speeds with only a small forward distance to another vehicle (e.g., as detected by a combination of external sensor data and speed data), etc. As another example, the insurance rating server 340 may determine that losses are less frequent and/or smaller for vehicles that are often driven in an automated/machine driving mode.

The insurance rating server 340 may generate correlation models based on the identified patterns and correlations, which may then be used with the vehicle data of an individual policy holder in order to determine a risk indicator for the policy holder (e.g., to be used in determining an insurance rating and/or premium for the policy holder), as discussed above in connection with FIG. 1. Generally, the correlation models may serve as a more reliable predictor of losses when vehicle data is collected from a larger number of vehicles 302 and/or over a longer period of time. In an embodiment, however, vehicle data is only collected from a particular vehicle if a policy holder associated with that vehicle has opted in to a program. For example, the insurance rating server 340 may only collect vehicle data (or, alternatively, only use previously collected vehicle data) from the vehicles of those policy holders who have opted into a premium discount program. In an embodiment, the correlation data omits any user-identifiable data in order to help preserve anonymity.

Figure 9:
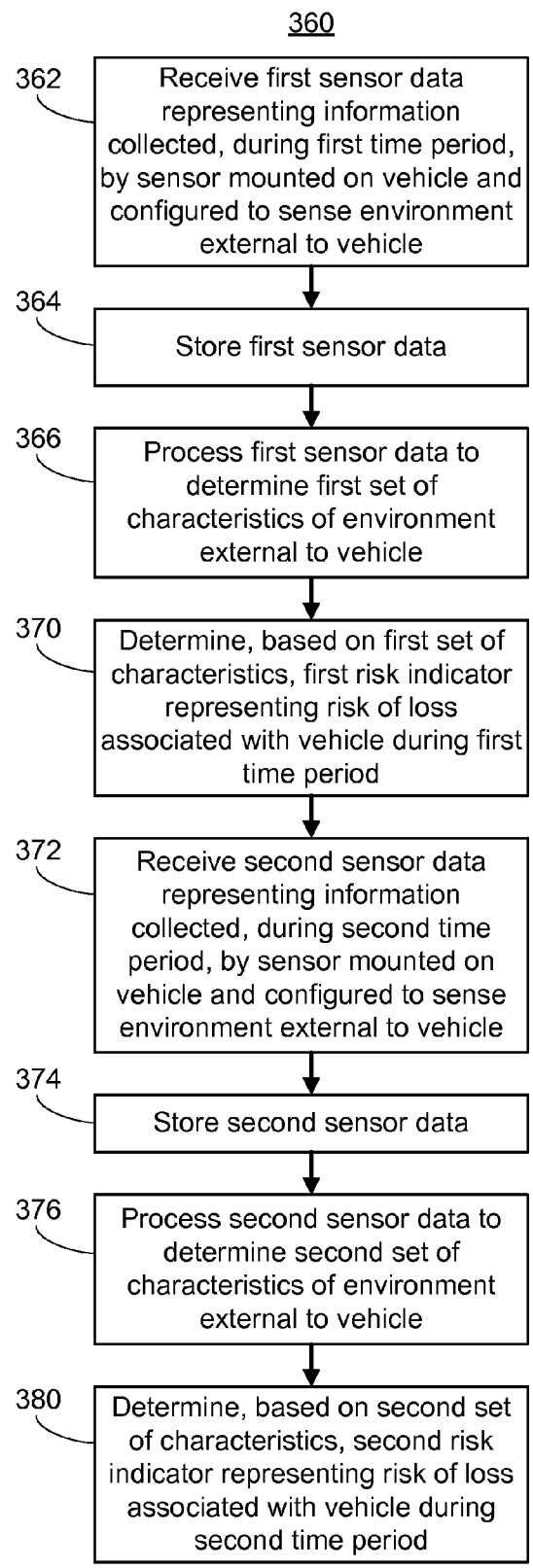
FIG. 9 is a flow diagram of an example method of utilizing external vehicle sensor data to determine an indication of risk over time.

As discussed above in connection with FIG. 1, risk indicators may be generated over time in order to adjust a premium of an existing/current policy holder, in some embodiments. FIG. 9 is a flow diagram of an example method 360 of utilizing external vehicle sensor data to determine risk indicators that may vary over time. In an embodiment, the method 360 is implemented at least in part by the onboard system 14 of FIG. 1. Alternatively, or additionally, in an embodiment, the method 360 is implemented in whole or in part by the insurer's computer system 16 of FIG. 1.

The method 360 receives first sensor data representing information that was collected, during a first time period, by a sensor configured to sense an environment external to the vehicle (block 362). The sensor is located on or in a vehicle associated with an existing insurance policy, and may be a device similar to that discussed above in connection with block 202 of method 200 (e.g., camera device, lidar device, etc.), for example. The first time period may be any suitable time period, such as one minute, one hour, one day, one week, one month, one quarter, one year, one billing cycle, etc. The first sensor data may be received by a unit within the vehicle (e.g., data collection unit 50 of FIG. 1), or in a manner similar to that described above in connection with block 202 of method 200 (e.g., at a server remote from the vehicle, etc.), for example. Moreover, the first sensor data may be data that was converted from other information generated by the sensor (e.g., as described above in connection with block 202 of method 200). In some embodiments where the first sensor data is received by a unit within the vehicle (or by a portable device that removably couples to the vehicle), the first sensor data may be received via a CAN bus. For example, the first sensor data may be included in a CAN bus message that was generated by a sensor device or sensor controller. In an embodiment, the first sensor data is received substantially in real-time (e.g., substantially as the data is generated by the sensor).

The method 360 also stores the first sensor data received at block 362 in a memory (block 364). Block 364 may be similar to block 204 of method 200, for example. The method 360 then retrieves the first sensor data from memory, and processes the first sensor data to determine a first set of one or more characteristics of the environment external to the vehicle (block 366). In some embodiments where the first sensor data is received substantially in real-time at block 362, the first set of characteristics is also determined substantially in real-time. The first set of characteristics corresponds to the first time period, i.e., the characteristics correspond to the external environment as sensed by the sensor during the first time period. For example, the determined characteristics may include an orientation of the vehicle with respect to another object (e.g., another vehicle, and/or a traffic light, stop sign or other traffic control indicator) during the first time period. As another example, the characteristics may include a closing speed between the vehicle and another object during the first time period. As another example, the characteristics may include a condition of a driving surface during the first time period. As yet another example, the characteristics may include visibility conditions (e.g., a visibility range, or whether snowy or rainy conditions exist, etc.) during the first time period. In some embodiments, the characteristics also include temporal information, such as a duration of at least one other characteristic. For example, the first set of characteristics may include both visibility information (e.g., an indication of the severity of poor visibility conditions) and duration information associated with the visibility information (e.g., the length of time that visibility was below a particular threshold).

The method 360 also determines, based on the first set of characteristics determined at block 366, a first risk indicator representing a risk of loss associated with the vehicle during the first time period (block 370). For example, the first risk indicator may indicate a relatively high risk of loss if the vehicle was driven in poor visibility conditions (e.g., below a threshold visibility range) for a long amount of time (e.g., above a threshold percentage of driving time) during the first time period. As another example, the first risk indicator may indicate a relatively high risk of loss if the vehicle was driven during the first time period such that the average following distance behind other vehicles was small (e.g., below a threshold distance). As yet another example, the first risk indicator may indicate a relatively low risk of loss if the vehicle was driven only on streets in good condition (e.g., having at least a threshold degree of smoothness, as detected by processing of lidar or sonar data, etc.) during the first time period.

In some embodiments where the first sensor data is received substantially in real-time at block 362, and the first set of characteristics is determined substantially in real-time at block 366, the first risk indicator is also determined substantially in real-time (e.g., immediately at the end of the first time period). Moreover, the first risk indicator may include a plurality of risk indices that correspond to a plurality of respective time periods within the first time period. For example, in an embodiment where the first time period is a one-month period, the method 360 may generate risk indices every hour during that month, or every hour that the vehicle is driven during that month. In this manner, the sensor data used to determine the risk indices, and the data representing the determined environmental characteristics on which the risk indices are based, can be deleted on a regular basis, and data storage requirements (e.g., at the vehicle) may be greatly reduced.

The method 360 also receives second sensor data representing information collected, during a second time period, by the sensor (block 372). Block 372 may be similar to block 362, for example, except that the second time period is later than the first time period. In some embodiments, the second time period has the same length as the first time period, and/or immediately follows the first time period.

The method 360 also stores the second sensor data received at block 372 in the memory (block 374). Block 374 may be similar to block 364, for example. The method 360 then retrieves the second sensor data from memory, and processes the second sensor data to determine a second set of one or more characteristics of the environment external to the vehicle (block 376). Block 376 may be similar to block 366, for example. The second set of characteristics, however, will generally differ from the first set of characteristics, so long as the external environment of the vehicle changes between the first and second time periods.

The method 360 also determines, based on the second set of characteristics determined at block 376, a second risk indicator representing a risk of loss associated with the vehicle during the second time period (block 380). Block 380 may be similar to block 370, for example. The second risk indicator may differ from the first risk indicator, however, depending on whether the environment in which the vehicle has been driven has changed sufficiently between the first and second time periods.

In some embodiments, some of the blocks of method 360 are performed in an order different than that shown in FIG. 9. For example, block 366 may be performed simultaneously with block 376, and/or block 370 may be performed simultaneously with block 380. Further, in some embodiments, the method 360 includes additional blocks. In one embodiment where sensor data is received at an electronic processing system within the vehicle, for example, the method 360 also causes data representing the first risk indicator to be wirelessly transmitted from the vehicle to a server, and causes data representing the second risk indicator to be wirelessly transmitted from the vehicle to the server. At the server, the data representing the first risk indicator and the data representing the second risk indicator may then be used to determine a first premium and a second premium, respectively, associated with the existing insurance policy (e.g., by calculating the premiums directly from the risk indicators, or by first determining insurance ratings based on the risk indicators, etc.). The first premium may be a premium to be billed to the driver of the vehicle during a first billing cycle, and the second premium may be a premium to be billed to the driver of the vehicle during a subsequent, second billing cycle, for example. Alternatively, both the first and the second risk indicator (and possibly additional risk indicators) may be used at the server to determine a single premium associated with the existing insurance policy.

In another embodiment, the method 360 also receives operational data that is indicative of operation, during the respective time period, of the vehicle, and stores the operational data (e.g., velocity of the vehicle, acceleration of the vehicle, rotational and translational G-forces of the vehicle, status of an automated driving system of the vehicle, diagnostics information associated with the vehicle, etc.) in the memory. In this embodiment, the method 360 may determine the first set of characteristics based not only on the first sensor data, but also on operational data indicative of operation of the vehicle during the first time period. For example, one of the characteristics may be an average following distance determined using the first sensor data, and another one of the characteristics may be an average velocity of the vehicle. Similarly, the method 360 may determine the second set of characteristics based not only on the second sensor data, but also on operational data indicative of operation of the vehicle during the second time period. In some embodiments in which operational data is received by a unit within the vehicle (or by a portable device that removably couples to the vehicle), the operational data may be received via a CAN bus (e.g., in the form of one or more CAN bus messages generated by one or more vehicle subsystems), and/or via one or more OBD ports.

In another embodiment, the method 360 also receives data that represents information that the vehicle received from an external source via a wireless link (e.g., using V2X technology), and is indicative of the state or location of one or more objects (e.g., locations of pedestrians, cyclists, vehicles or other objects, traffic light states, street configurations, etc.), and/or is indicative of one or more environmental conditions (e.g., weather, visibility, etc.), during the respective time period, and stores the data in the memory. In this embodiment, the method 360 may determine the first set of characteristics based not only on the first sensor data, but also on the data representing the external source information corresponding to the first time period. For example, one characteristic that is determined based on the external source information may be the number and/or locations of pedestrians (and/or cyclists, etc.) in close proximity to the vehicle. Similarly, the method 360 may determine the second set of characteristics based not only on the second sensor data, but also on data representing information that the vehicle received from an external source via a wireless link (e.g., additional V2X signals) during the second time period.

Figure 10:
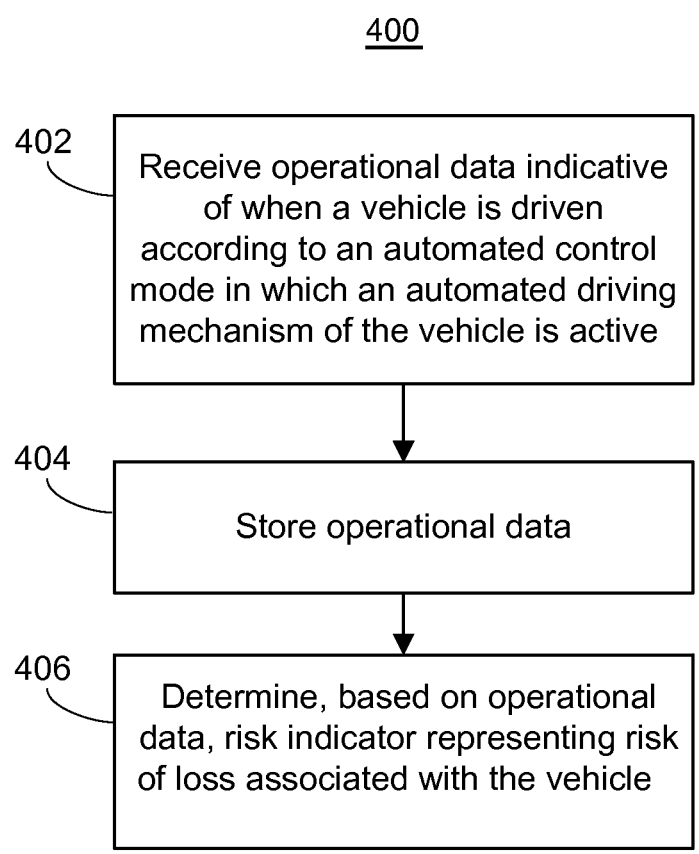
FIG. 10 is a flow diagram of an example method of utilizing an indication of automated versus human driving to determine risk for insurance rating purposes.

While risk indicators may be based on any of various different factors, one factor that may predict risk particularly well is the degree of automated operation/driving of the vehicle. For example, fully automated/machine driving may be significantly safer than human driving, and/or partially automated driving (e.g., utilizing a conventional cruise control system) may be significantly safer, or significantly less safe, than human driving. Such correlations may be learned using the system 300 of FIG. 8, for example. FIG. 10 is a flow diagram of an example method 400 of utilizing an indication of automated versus human driving to determine risk for insurance rating purposes. In an embodiment, the method 400 is implemented at least in part by the onboard system 14 of FIG. 1. Alternatively, or additionally, in an embodiment, the method 400 is implemented in whole or in part by the insurer's computer system 16 of FIG. 1.

The method 400 receives operational data indicative of when a vehicle is driven according to an automated control mode in which an automated driving system of the vehicle is active (block 402). The operational data may be data that was directly generated by one or more subsystems of the vehicle, data that was converted from other information (e.g., other data or analog signals) generated by one or more subsystems of the vehicle, and/or data that was generated in response to the direct detection of one or more manual or machine inputs that control operation of the vehicle, for example.

The operational data may be received at a unit arranged within the vehicle, such as the data collection unit 50 or the data collection unit 70 of FIG. 1, for example. Moreover, the operational data may be received from one or more subsystems arranged within the vehicle, such as one or more of subsystems 40, 42, 44 and 46 in FIG. 1. In an alternative embodiment, the operational data is received at a server remote from the vehicle (e.g., a server configured in a manner similar to the insurer's computer system 16 of FIG. 1) via a wireless communication network (e.g., network 20 of FIG. 1) or a portable memory device, for example.

In an embodiment, the automated driving system is any hardware, firmware and/or software that controls, or partially controls, the velocity, braking, and/or steering of the vehicle. For example, the automated control mode may be a conventional cruise control mode in which a velocity control system is active, an assisted braking mode in which a braking control system is active, or an assisted steering mode in which a steering control system is active. The operational data may be generated by a braking subsystem such as braking subsystem 40 of FIG. 1, a speed subsystem such as speed subsystem 42 of FIG. 1, a steering subsystem such as steering subsystem 44 of FIG. 1, and/or a diagnostics system such as diagnostics subsystem 46 of FIG. 1, for example, or by a different subsystem of the vehicle. In some embodiments, the operational data additionally includes data indicative of other operational parameters of the vehicle, such as velocity and/or acceleration.

The method 400 also stores the operational data received at block 402 in a memory (block 404), such as memory 52 or memory 72 of FIG. 1, for example. The method 400 then retrieves the operational data from memory and, based on the operational data, determines a risk indicator representing a risk of loss associated with the vehicle (block 406). The risk indicator may be determined based on a total length of time in which the vehicle is driven according to the automated control mode, and/or based on a percentage of time in which the vehicle is driven according to the automated control mode, for example. If the operational data is also indicative of other operational parameters of the vehicle, such as velocity and/or acceleration, the risk indicators may be determined based in part on those operational parameters as well. In some embodiments, the determined risk indicator comprises a plurality of risk indices corresponding to a plurality of respective time periods.

In some embodiments, the method 400 includes additional blocks not shown in FIG. 10. In one embodiment where the operational data is received at a unit arranged within the vehicle, for example, the method 400 also causes data representing the determined risk indicator to be wirelessly transmitted from the vehicle to a server, where the data may then be used to determine an insurance rating and/or premium associated with the vehicle. In another embodiment, the method 400 also receives sensor data representing information collected by a sensor that is located on or in the vehicle and configured to sense an environment external to the vehicle (e.g., similar to block 202 of method 200). In this embodiment, the method 400 further stores the received sensor data in a memory, and the risk indicator is determined based not only on the operational data, but also the stored sensor data (e.g., in a manner similar to that discussed above in connection with method 360 of FIG. 9).

Figure 11:
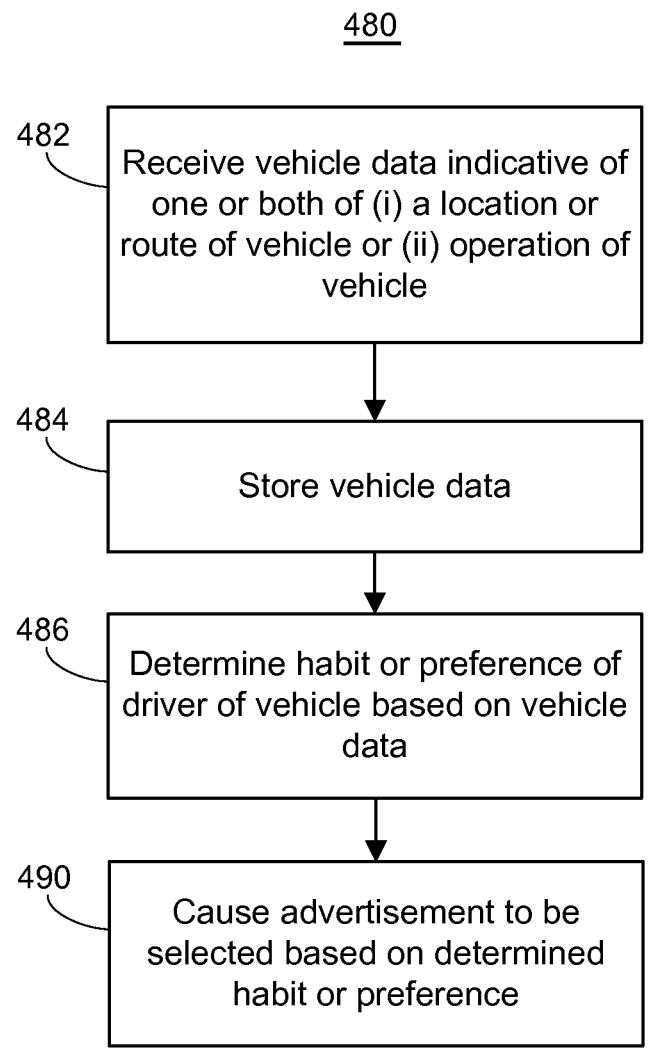
FIG. 11 is a flow diagram of an example method of utilizing data indicative of location, route, and/or operation of a vehicle is used for targeted advertising purposes.

As discussed above in connection with FIG. 1, in some embodiments, advertising is targeted to particular drivers based on the determined habits or preferences of those drivers. FIG. 11 is a flow diagram of an example method 480 of utilizing data indicative of location, route, and/or operation of a vehicle for targeted advertising purposes. In an embodiment, the method 480 is implemented in whole or in part by the insurer's computer system 16 of FIG. 1. Alternatively, or additionally, in an embodiment, the method 480 is implemented at least in part by a computer system of a different entity than the insurer, such as any entity that may wish to advertise to the driver or owner of a vehicle.

The method 480 receives vehicle data indicative of a location or route of a vehicle, and/or indicative of operation of the vehicle (block 482). The vehicle data may be received at a unit arranged within a server remote from the vehicle, such as the data collection unit 70 of FIG. 1, for example. In one embodiment, the vehicle data is received via a wireless communication network (e.g., network 20 of FIG. 1). The vehicle data may include external sensor data (e.g., data generated by external sensor 30 and/or 32 of FIG. 1), data representing one or more operational parameters (e.g., data generated by one or more of subsystems 40, 42, 44 and 46 of FIG. 1), and/or location data (e.g., data generated by GPS subsystem 48 of FIG. 1), for example. The vehicle data may be data that was directly generated by the sensor(s) and/or subsystem(s), and/or data that was converted from other information (e.g., other data or analog signals) generated by the sensor(s) and/or subsystem(s), for example. In some embodiments, the vehicle data also includes data representing information that the vehicle received from an external source (e.g., using V2X technology).

In embodiments where the vehicle data is indicative of a location or route of the vehicle, the vehicle data may reflect specific locales visited by the driver/vehicle, such as particular restaurants, bars, retail stores, entertainment facilities (e.g., movie theaters, sports stadiums, etc.), for example. Alternatively, the vehicle data may reflect general types/categories of locales visited by the driver/vehicle, without further identifying specific locations. The vehicle data may indicate the location or route in various different ways, according to different embodiments. In one embodiment where the vehicle data is location data generated by a GPS device located on or in the vehicle (e.g., GPS subsystem 48 in FIG. 1), for example, the location data may be used in conjunction with other map/directory information to match locations of the vehicle to particular known locations. In another example embodiment, where the vehicle data was generated by a camera or other external sensor device located on or in the vehicle (e.g., external sensor 30 in FIG. 1), the images provided by the data of the camera or other sensor may be processed to identify particular known locations.

In embodiments where the vehicle data is instead (or additionally) indicative of operation of the vehicle, the vehicle data may reflect any operational parameter of the vehicle, such as velocity, steering, diagnostics information, or whether an automated driving system is active, for example. The vehicle data may be data that was generated by one or more operational subsystems of the vehicle (e.g., subsystems 40, 42, 44 and/or 46 in FIG. 1), for example. In embodiments where the vehicle data instead (or additionally) includes data representing information that the vehicle had received from an external source (e.g., using V2X technology), the vehicle data may reflect the identity, type, status or location of any object(s) or locale(s) in the vicinity of the vehicle, or any environmental condition (e.g., weather, visibility, etc.), for example.

The method 480 also stores the vehicle data received at block 482 in a memory (block 484), which may be similar to memory 72 of FIG. 1, for example. The method 480 then retrieves the vehicle data from memory, and determines a habit or preference of the driver of the vehicle based on the vehicle data (block 486). In one embodiment where the vehicle data received at block 482 is indicative of routes taken by the vehicle, for example, the driver's habit or preference may be determined to be a preferred route that has been followed repeatedly by the vehicle (e.g., on a commute to or from work), a length of that route (e.g., in miles or minutes), a time at which that route is usually traveled, etc. As another example, in one embodiment where the vehicle data received at block 482 is indicative of locations of the vehicle, the driver's habit or preference may be determined to be a particular locale or type of locale that is repeatedly visited by the driver, a time at which the driver tends to visit that locale or type of locale, an amount of time spent at that locale or type of locale, etc. As yet another example, in one embodiment where the vehicle data received at block 482 is indicative of operation of the vehicle, the driver's habit or preference may be determined to be a habit or preference of the driver with respect to operation of the vehicle, such as a speed that the driver likes to drive, the manner in which the driver tends to steer or operate the brakes, how closely the driver tends to follow other vehicles, etc.

The method 480 also causes an advertisement to be selected based on the habit or preference determined at block 486 (block 490). The method 480 may cause the advertisement to be selected in various different ways according to different embodiments. In one embodiment, for example, the method 480 causes an indication of the habit or preference determined at block 486 to be sent to an advertising entity (e.g., an entity that desires to advertise its service or product). The indication may be an email or other electronic message that describes the habit or preference, or that provides a code representing a particular class of habits or preferences, for example. In another example embodiment, the method 480 causes an indication of the habit or preference determined at block 486 to be provided to a computer system (e.g., a computer system owned by the insurer) that is configured to automatically select an advertisement based on the habit or preference.

Advertisement selection criteria may generally be determined based on previous market studies or correlation analyses. For example, it may become known that drivers who often take routes that avoid more congested traffic (e.g., on their daily commute to or from work), even at the expense of a longer commute time, tend to like or dislike certain types of products or services, and that drivers who instead take routes that result in a shorter commute time, even at the expense of more congestion, tend to like or dislike other products or services. As another, more intuitive example, it may be known that drivers who often stop at convenience stores tend to be more receptive to advertisements for other, nearby convenience stores, regardless of whether those particular convenience stores have been visited previously by the drivers. As yet another example, it may be known that drivers who have a particular driving style (e.g., heavy brake usage, frequently driving at a relatively high or low speed, etc.) tend to be more or less receptive to certain advertising styles. In this latter case, a single advertisement may be selected from a plurality of advertisements that are all directed to the same product or service.

In some embodiments, the method 480 includes additional blocks not shown in FIG. 11. In one embodiment, for example, the method 480 also selects the advertisement based on the habit or preference determined at block 486. In an embodiment where the method 480 is entirely performed within the insurer's computer system 16 of FIG. 1, for example, the method 480 may select an advertisement for an insurance product or service based on the determined habit or preference. In some embodiments, the method 480 also causes the selected advertisement to be provided to the driver. For example, the method 480 may cause the advertisement to be provided to the driver while still driving in the vehicle (e.g., via internet radio), or via email for later viewing, etc.

Figure 12:
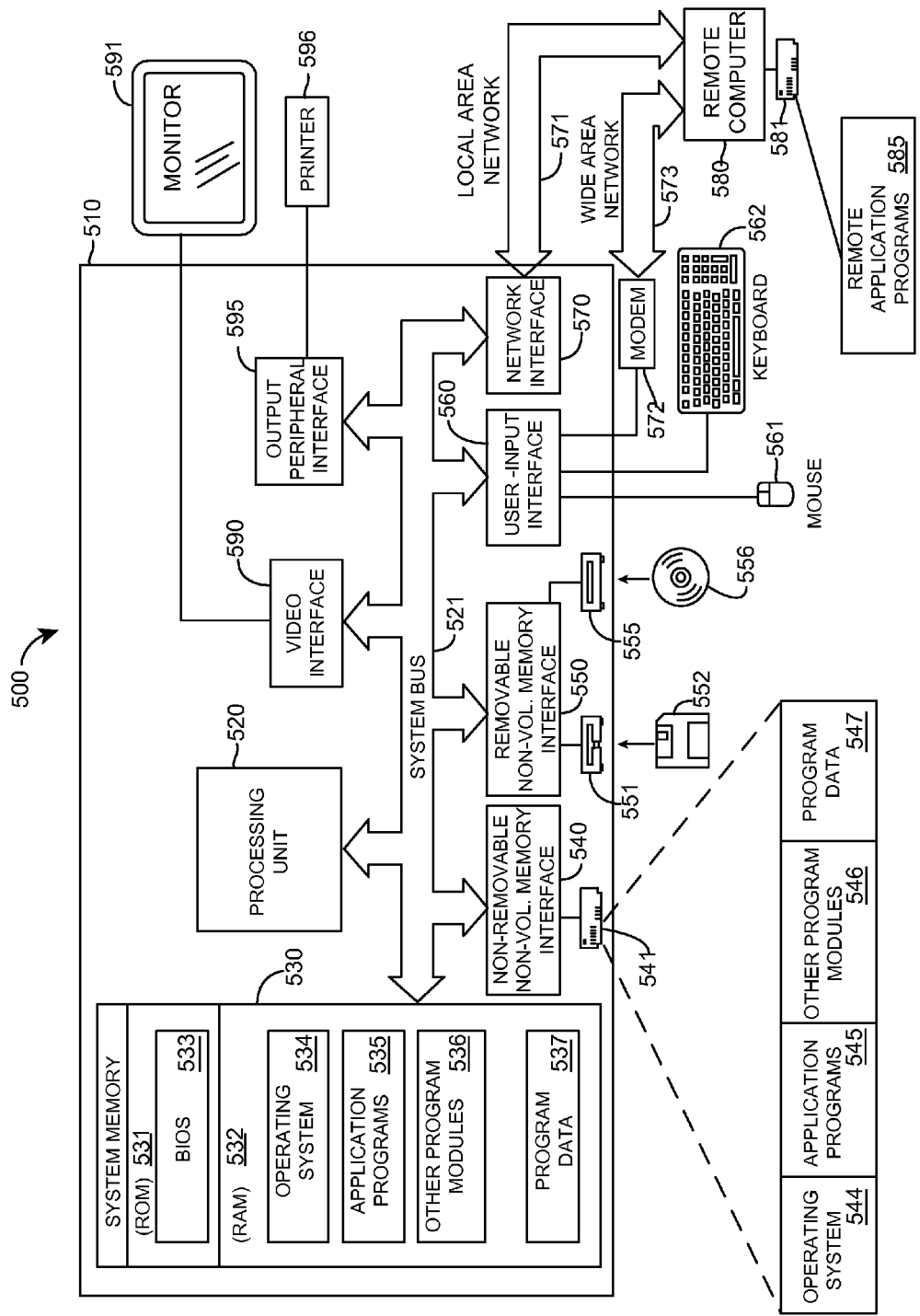
FIG. 12 is a block diagram of an example computer system on which an example method may operate in accordance with any of the described embodiments.

FIG. 12 is a block diagram of an example computer system 500 on which a method may operate in accordance with any of the embodiments described above. The computer system 500 of FIG. 12 includes a computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 typically includes a variety of computer-readable media. Computer-readable media can be any available media that can be accessed by computer 510 and includes both volatile and nonvolatile media, and both removable and non-removable media. By way of example, and not limitation, computer-readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, read only memory (ROM), EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer-readable media.

The system memory 530 includes computer storage media in the form of volatile and/or nonvolatile memory such as ROM 531 and RAM 532. A basic input/output system (BIOS) 533, containing the basic routines that help to transfer information between elements within computer 510, such as during start-up, is typically stored in ROM 531. RAM 532 typically contains data and/or program modules that are immediately accessible to, and/or presently being operated on by, processing unit 520. By way of example, and not limitation, FIG. 12 illustrates operating system 534, application programs 535, other program modules 536, and program data 537.

The computer 510 may also include other removable/non-removable, volatile/nonvolatile computer storage media. By way of example only, FIG. 12 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 12 provide storage of computer-readable instructions, data structures, program modules and other data for the computer 510. In FIG. 12, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different reference numbers in FIG. 12 to illustrate that, at a minimum, they are different copies. A user may enter commands and information into the computer 510 through input devices such as a keyboard 562 and cursor control device 561, commonly referred to as a mouse, trackball or touch pad. A monitor 591 or other type of display device is also connected to the system bus 521 via an interface, such as a graphics controller 590. In addition to the monitor 591, computers may also include other peripheral output devices such as printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 12. The logical connections depicted in FIG. 12 include a local area network (LAN) 571 and a wide area network (WAN) 573, but may also include other networks. Such networking environments are commonplace in hospitals, offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the input interface 560, or via another appropriate mechanism. In a networked environment, program modules depicted relative to the computer 510, or portions thereof, may be stored in the remote memory storage device 581. By way of example, and not limitation, FIG. 12 illustrates remote application programs 585 as residing on memory device 581.

The communications connections 570, 572 allow the device to communicate with other devices. The communications connections 570, 572 are an example of communication media, as discussed above.

The methods of any of the embodiments described above (e.g., methods 200, 220, 240, 260, 360, 400, and/or 480) may be implemented wholly or in part using one or more computer systems such as the computer system 500 illustrated in FIG. 12. Referring generally to the embodiments of FIG. 1, for example, the computer 510 may be used as the insurer's computer system 16, with the various units 80, 82, 84 and 86 being instructions that are a part of application programs 535 stored in RAM 532 and/or application programs 545 stored in hard disk drive 541. For example, data from onboard system 14 may be received via a modem similar to the modem 572, which may in turn be coupled to a network similar to network 20 of FIG. 1. As another example, risk indicators generated by the risk determination unit 80 of FIG. 1 may be sent to a remote insurance rating system and/or remote billing system similar to the remote computer 580, where the data is stored on a memory device such as the memory storage device 581. As another example, the correlation data 90 may be provided to the insurer's computer system 16 of FIG. 1 as a removable memory source such as the nonvolatile magnetic disk 552 or the nonvolatile optical disk 556.

Some or all calculations performed in the embodiments described above (e.g., calculations for determining risk indicators, calculations for determining habits or preferences of a driver, etc.) may be performed by a computer such as the computer 510, and more specifically may be performed by a processor such as the processing unit 520, for example. In some embodiments, some calculations may be performed by a first computer such as the computer 510 while other calculations may be performed by one or more other computers such as the remote computer 580. The calculations may be performed according to instructions that are part of a program such as the application programs 535, the application programs 545 and/or the remote application programs 585, for example.

A computer such as the computer 510 may also cause any of the virtual models described in the above embodiments, such as animated re-creations of accidents involving vehicles, to be displayed to a user of the computer 510. For example, data may be sent over a video interface such as the video interface 590 in order to display the virtual model on an output device such as the monitor 591.

We claim:

1. A method in an electronic processing system comprising a first memory and one or more processors, the method comprising:
   receiving, at the electronic processing system, sensor data representing information collected by one or more sensors (i) located on or in a first vehicle and (ii) configured to sense an environment external to the first vehicle;
   storing the received sensor data in the first memory;
   processing, by the one or more processors, the stored sensor data to determine
      conditions in which the second vehicle was driven and within the environment external to the first vehicle,
      driving habits of a driver of the second vehicle, and
      a license plate number of the second vehicle;
   identifying the driver of the second vehicle using the determined license plate number; and
   determining a risk level for the driver of the second vehicle using (i) the conditions in which the second vehicle was driven and within the environment external to the first vehicle, and (ii) the driving habits of the driver of the second vehicle.

2. The method of claim 1, wherein receiving sensor data representing information collected by one or more sensors includes receiving sensor data representing information collected by at least one of:
   a camera device;
   a radar device;
   a lidar device; or
   a sonar device.

3. The method of claim 1, wherein receiving sensor data includes receiving sensor data from the vehicle via one of:
   a wireless communication network; or
   a portable memory device.

4. The method of claim 1, further comprising:
   updating an insurance rating of the driver of the second vehicle using the determined risk level.

5. A tangible, non-transitory computer-readable storage medium storing computer-readable instructions that, when executed by one or more processors, cause the one or more processors to:
   retrieve, from a first memory, sensor data representing sensor information collected by one or more sensors (i) located on or in a first vehicle and (ii) configured to sense an environment external to the first vehicle;
   process the retrieved sensor data to determine
      conditions in which the second vehicle was driven and within the environment external to the first vehicle,
      driving habits of a driver of the second vehicle, and
      a license plate number of the second vehicle;
   identify the driver of the second vehicle using the determined license plate number; and
   determine a risk level for the driver of the second using (i) the conditions in which the second vehicle was driven and within the environment external to the first vehicle, and (ii) the driving habits of the driver of the second vehicle.

6. The tangible, non-transitory computer-readable storage medium of claim 5, wherein the instructions, when executed by the one or more processors, further cause the one or more processors to:
  update an insurance rating of the driver of the second vehicle using the determined risk level.

* * * * *